US011307296B2

(12) United States Patent
Nagai et al.

(10) Patent No.: US 11,307,296 B2
(45) Date of Patent: Apr. 19, 2022

(54) TIME-OF-FLIGHT DISTANCE MEASURING DEVICE AND METHOD FOR DETECTING MULTIPATH ERROR

(71) Applicants: DENSO CORPORATION, Kariya (JP); ESPROS PHOTONICS AG, Sargans (CH)

(72) Inventors: Toshiaki Nagai, Kariya (JP); Martin Popp, Chur (CH); Cengiz Tugsav Kupcu, Adliswil (CH)

(73) Assignees: DENSO CORPORATION, Kariya (JP); ESPROS PHOTONICS AG, Sargans (CH)

( * ) Notice: Subject to any disclaimer, the term of this patent is extended or adjusted under 35 U.S.C. 154(b) by 890 days.

(21) Appl. No.: 16/075,847

(22) PCT Filed: Feb. 8, 2016

(86) PCT No.: PCT/JP2016/000640
§ 371 (c)(1),
(2) Date: Aug. 6, 2018

(87) PCT Pub. No.: WO2017/138033
PCT Pub. Date: Aug. 17, 2017

(65) Prior Publication Data
US 2019/0056482 A1    Feb. 21, 2019

(51) Int. Cl.
*G01S 7/497* (2006.01)
*G01S 17/36* (2006.01)
(Continued)

(52) U.S. Cl.
CPC .......... *G01S 7/497* (2013.01); *G01S 7/4815* (2013.01); *G01S 7/4911* (2013.01); *G01S 17/36* (2013.01); *G01S 17/894* (2020.01); *G01S 17/931* (2020.01)

(58) Field of Classification Search
None
See application file for complete search history.

(56) References Cited

U.S. PATENT DOCUMENTS 8,660,436 B2 *  2/2014  Schenk ................. H05B 47/19
                                                   398/172
8,760,499 B2    6/2014  Russell
                        (Continued)

FOREIGN PATENT DOCUMENTS

JP    2010-025906 A    2/2010
JP    2010-096730 A    4/2010
                       (Continued)

*Primary Examiner* — Yuqing Xiao
*Assistant Examiner* — Amir J Askarian
(74) *Attorney, Agent, or Firm* — Maschoff Brennan

(57) ABSTRACT

The present disclosure relates to a time-of-flight distance measuring device. The light source (24) includes a plurality of emitting portions (70, 72), each of which illuminates a respective one of the sub-regions (R1, R2). The light receiver (26) includes a plurality of receiving portions (74, 76) corresponding to respective ones of the emitting portions (70, 72). The first controller (28) controls (i) a first emitting portion (70) to emit the emitted light including an $N^{th}$-order harmonic component of a fundamental frequency and (ii) a second emitting portion (72) to emit the emitted light including an $M^{th}$-order harmonic component. The second controller (30) controls a particular receiving portion (74) corresponding to the first emitting portion (70) to be sensible to the $N^{th}$-order $M^{th}$-order harmonic components. The multipath detector (82) detects occurrence of the multipath error when the particular receiving portion (74) senses both the $N^{th}$-order and $M^{th}$-order components.

11 Claims, 15 Drawing Sheets

(51) Int. Cl.
  *G01S 7/481* (2006.01)
  *G01S 7/4911* (2020.01)
  *G01S 17/894* (2020.01)
  *G01S 17/931* (2020.01)

(56) References Cited

U.S. PATENT DOCUMENTS

| | | | |
|---|---|---|---|
| 8,803,967 B2 | 8/2014 | Oggier et al. | |
| 9,451,141 B2 * | 9/2016 | Kadambi | G01S 7/4815 |
| 10,739,446 B2 * | 8/2020 | Itoh | G01S 17/10 |
| 2010/0051836 A1 | 3/2010 | Kim | |
| 2011/0157354 A1 | 6/2011 | Kawahito | |
| 2011/0194099 A1 | 8/2011 | Kamiyama | |
| 2013/0116977 A1 | 5/2013 | Godbaz et al. | |
| 2013/0148102 A1 | 6/2013 | Oggier | |
| 2013/0228691 A1 | 9/2013 | Shah | |
| 2013/0293684 A1 | 11/2013 | Becker et al. | |
| 2014/0038613 A1 | 2/2014 | Toskala et al. | |
| 2014/0055771 A1 | 2/2014 | Oggier | |
| 2014/0340569 A1 | 11/2014 | Raskar et al. | |
| 2014/0347443 A1 | 11/2014 | Cohen et al. | |
| 2015/0241564 A1 | 8/2015 | Takano | |
| 2017/0212224 A1 * | 7/2017 | Itoh | G01S 17/10 |

FOREIGN PATENT DOCUMENTS

| | | |
|---|---|---|
| JP | 2013-535675 A | 9/2013 |
| JP | 5579893 B2 | 8/2014 |
| JP | 5585903 B2 | 9/2014 |
| WO | 2014/097539 A | 6/2014 |

\* cited by examiner (a)

(b)

(b)

(a)

TIME-OF-FLIGHT DISTANCE MEASURING DEVICE AND METHOD FOR DETECTING MULTIPATH ERROR

FIELD

The present disclosure relates to a time-of-flight distance measuring device and a method for detecting a multipath error.

BACKGROUND

As a method for measuring the distance to an object in a scene, a time-of-flight (TOF) technology has been developed. Such a TOF technology may be used in a variety of fields, such as automotive industries, human-interfaces and gaming, robotics or the like. Generally, the TOF technology works by illuminating a scene with modulated light emitted from a light source and by observing reflected light reflected by an object in the scene. By measuring the phase difference between the emitted light and the reflected light, the distance to the object is calculated (see, e.g., Patent Literatures 1 to 4).

In a distance measuring device using such a conventional TOF technology, multipath interference may affect the accuracy of the measured distance. The multipath interference arises when the emitted light travels along multiple paths that have a different path length from each other and then is sensed by a single photo receiver as integrated light. Although the phases of light along the different path lengths are different from each other, the conventional distance measuring device computes a distance based on mixed phases of the integrated light. Therefore, the computed distance may include an error value arising from the multipath interference.

Patent Literature 5 presents a technique for detecting a multipath error based on a light exposure amount of a light receiver. In Patent Literature 5, a light emitter emits light to illuminate a given region. The region is divided into a plurality of sub-regions, and a controller is configured to control the light emitter to vary the amount of emitted light for each sub-region, thereby emitting different light emission patterns at different timings. The controller calculates an exposure amount of light received at the light receiver for each sub-region and detects a multipath error based on the exposure amount calculated. Specifically, the controller calculates, at a first timing, an exposure amount at the light receiver for a first emission pattern, and then the controller calculates, at a second timing, an exposure amount at the light receiver for a second emission pattern. Based on the difference between the exposure amount calculated at the first timing and the exposure amount calculated at the second timing, the controller determines whether a multipath error occurs.

However, to detect a multipath error with the technique according to Patent Literature 5, the exposure amount must be calculated for two different light emission patterns (i.e., at the first timing and the second timing). Accordingly, a time lag due to the sequential calculation of the exposure amount is inevitably generated according to the method of Patent Literature 5. Because of the time lag, the accuracy of detecting a multipath error may deteriorate. For example, in a case where multipath interference occurs during the first timing but the multipath is resolved prior to the second timing, the controller may not correctly detect the multipath error, which may affect the accuracy of the calculated distance to an object.

CITATION LIST

Patent Literature

PTL 1: JP 5579893 B
PTL 2: JP 2010-96730 A
PTL 3: JP 5585903 B
PTL 4: JP 2010-025906 A
PTL 5: WO 2014/097539 A1

SUMMARY

This section provides a general summary of the disclosure, and is not a comprehensive disclosure of its full scope or all of its features.

The objective of the present disclosure is to provide a time-of-flight distance measuring device and a method for detecting a multipath error that may detect a multipath error without a time lag.

In a first aspect of the present disclosure, a time-of-flight distance measuring device including a light source that emits light, as emitted light, to illuminate a specified region, a light receiver that detects, as reflected light, the emitted light reflected by an object in the specified region, a first controller that controls the light source, a second controller that controls the light receiver, a calculator that calculates a distance to the object based on the reflected light detected by the light receiver, and a multipath detector that detects occurrence of a multipath error. The specified region is divided into a plurality of sub-regions. The light source includes a plurality of emitting portions, each of the plurality of emitting portions illuminating a respective one of the plurality of sub-regions. The light receiver includes a plurality of receiving portions corresponding to respective ones of the plurality of emitting portions, each of the plurality of receiving portions being spaced away from each other to sense the reflected light reflected from the sub-region illuminated by the corresponding emitting portion. The first controller controls (i) a first emitting portion of the plurality of emitting portions to emit the emitted light as an amplitude-modulated waveform including an $N^{th}$-order harmonic component of a fundamental frequency and (ii) a second emitting portion of the plurality of emitting portions to emit the emitted light as an amplitude-modulated waveform including an $M^{th}$-order harmonic component of the fundamental frequency, wherein N and M are different positive integers. The second controller controls a particular receiving portion of the plurality of receiving portions corresponding to the first emitting portion of the plurality of emitting portions to be sensible to the $N^{th}$-order harmonic component and the $M^{th}$-order harmonic component. The multipath detector detects occurrence of the multipath error when the particular receiving portion senses both the $N^{th}$-order component and the $M^{th}$-order component.

According to the first aspect of the present disclosure, the first controller controls the second emitting portion to emit the emitted light including the $M^{th}$-order harmonic component and the second controller controls the specified receiving portion to be sensible to the $N^{th}$-order harmonic component and the $M^{th}$-order harmonic component. The multipath detector detects occurrence of a multipath error when the specified receiving portion senses both the $N^{th}$-order harmonic component and the $M^{th}$-order harmonic component. Thus, it is possible to detect occurrence of a multipath error without generating a time lag.

In a second aspect of the present disclosure, a time-of-flight distance measuring device including a light source that emits light, as emitted light, to illuminate a specified region, a light receiver that detects, as reflected light, the emitted light reflected by an object in the specified region, a first controller that controls the light source, a second controller that controls the light receiver, a calculator that calculates a distance to the object based on the reflected light detected by the light receiver, and a multipath detector that detects occurrence of a multipath error. The specified region is divided into a plurality of sub-regions. The light source includes a plurality of emitting portions, each of the plurality of emitting portions illuminating a respective one of the plurality of sub-regions. The light receiver includes a plurality of receiving portions corresponding to respective ones of the plurality of emitting portions, each of the plurality of receiving portions being spaced away from each other to sense the reflected light reflected from the sub-region illuminated by the corresponding emitting portion. The first controller controls, at a first timing, (i) a first emitting portion of the plurality of emitting portions to emit the emitted light as an amplitude-modulated waveform including an $N^{th}$-order harmonic component of a fundamental frequency and (ii) a second emitting portion of the plurality of emitting portions to emit the emitted light as an amplitude-modulated waveform including an $M^{th}$-order harmonic component of the fundamental frequency, wherein N and M are different positive integers, and at a second timing, (i) the second emitting portion to emit the emitted light as an amplitude-modulated waveform including the $N^{th}$-order harmonic component of the fundamental frequency and (ii) the first emitting portion to emit the emitted light as an amplitude-modulated waveform including the $M^{th}$-order harmonic component of the fundamental frequency. The second controller controls, at the first timing, a first receiving portion of the plurality of receiving portions corresponding to the first emitting portion to be sensible to the $N^{th}$-order harmonic component and the $M^{th}$-order harmonic component, and at the second first timing, a second receiving portion of the plurality of receiving portions corresponding to the second emitting portion to be sensible to the $N^{th}$-order harmonic component and the $M^{th}$-order harmonic component. The multipath detector detects occurrence of the multipath error when (i) the first receiving portion senses, at the first timing, both the $N^{th}$-order component and the $M^{th}$-order component or (ii) the second receiving portion senses, at the second timing, both the $N^{th}$-order component and the $M^{th}$-order component.

According to the second aspect of the present disclosure, the second controller controls, at the first timing, the first receiving portion to be sensible to the $N^{th}$-order harmonic component and the $M^{th}$-order harmonic component. The multipath detector detects occurrence of a multipath error when the first receiving portion senses, at the first timing, both the $N^{th}$-order harmonic component and the $M^{th}$-order harmonic component. Thus, it is possible to detect occurrence of a multipath error at the first timing without generating a time lag. Similarly, the second controller controls, at the second timing, the second receiving portion to be sensible to the $N^{th}$-order harmonic component and the $M^{th}$-order harmonic component. The multipath detector detects occurrence of a multipath error when the second receiving portion senses, at the second timing, both the $N^{th}$-order harmonic component and the $M^{th}$-order harmonic component. Thus, it is possible to detect occurrence of a multipath error at the second timing without generating a time lag.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The disclosure, together with additional objectives, features and advantages thereof, will be best understood from the following description, the appended claims and the accompanying drawings, in which:

DESCRIPTION OF EMBODIMENTS

Figure 1:
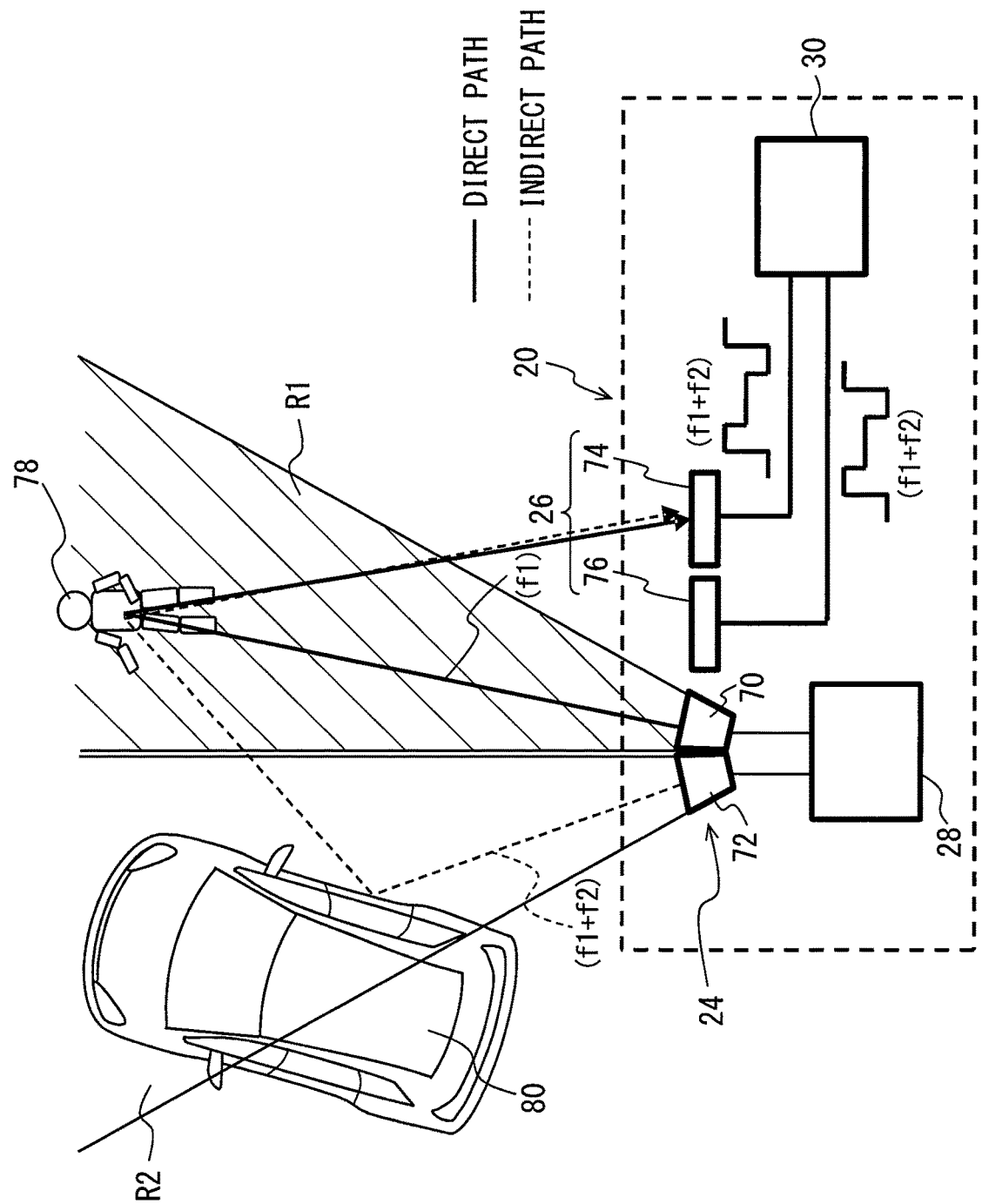
FIG. 1 is a schematic diagram of a time-of-flight distance measuring device according to a first embodiment.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration.

The parts may be combined even if it is not explicitly described that the parts can be combined. The embodiments may be partially combined even if it is not explicitly described that the embodiments can be combined, provided there is no harm in the combination.

First Embodiment

Here, a time-of-flight distance measuring device and a method for detecting a multipath error according to the first embodiment will be described with reference to the accompanying drawings. In this embodiment, and other subsequent embodiments, the time-of-flight distance measuring device (hereinafter, collectively "TOF device") is used in a vehicle to calculate a distance from the vehicle to an object (i.e., from the TOF device to the object), but the usage of the TOF device is not limited to a vehicle. For example, the TOF device may be used for human-interface devices, gaming consoles, robots or the like. The "object" for the TOF device may include a pedestrian 78, other vehicles, obstacles on a road, buildings or the like.

(General Configuration)

Figure 2:
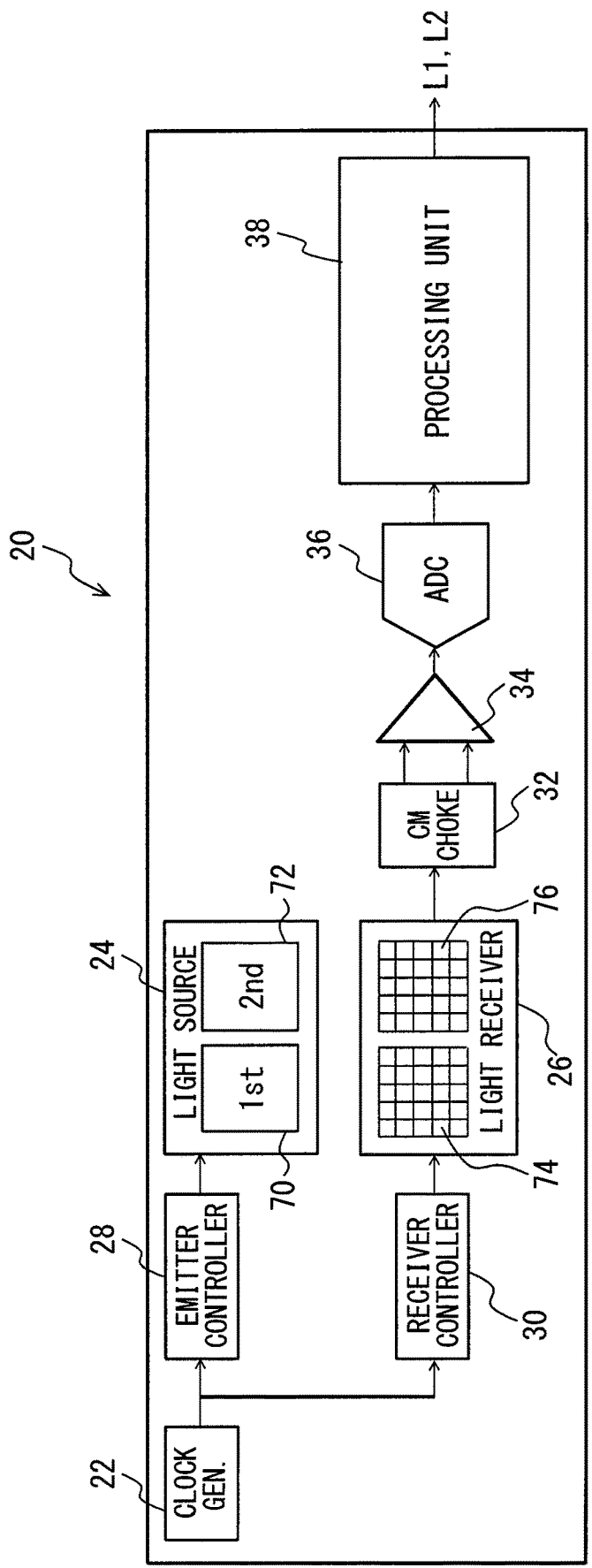
FIG. 2 is a block diagram of a time-of-flight distance measuring device according to the first embodiment.

FIG. 1 schematically illustrates a TOF device 20 according to the first embodiment and FIG. 2 shows a block diagram of the TOF device 20. The TOF device 20 includes a clock generator 22, a light source 24, a light receiver 26, an emitter controller (first controller) 28, a receiver controller (second controller) 30, a common-mode choke 32, a differential amplifier 34, an A/D converter 36, and a processing unit 38. In the present embodiment, the light source 24 includes a first emitting portion (emitting portion) 70 and a second emitting portion (emitting portion) 72, and the light receiver 26 includes a first receiving portion (receiving portion, particular receiving portion) 74 and a second receiving portion (receiving portion) 76.

The clock generator 22 generates and outputs a clock signal to both the emitter controller 28 and the receiver controller 30 to establish synchronization between the light source 24 and the light receiver 26. Upon receiving the clock signal from the clock generator 22, the emitter controller 28 and the receiver controller 30 generate and output a variety of signals to the light source 24 and the light receiver 26, respectively, to work in synchronism with each other.

When the emitter controller 28 receives the clock signal from the clock generator 22, the emitter controller 28 outputs a square wave as an emission control signal to the light source 24. In this embodiment, the light source 24 emits light, as emitted light, with a square waveform (i.e., an amplitude-modulated waveform) corresponding to the emission control signal. Hence, the emitted light has a same waveform as the emission control signal. However, the light source 24 may emit light having a sine waveform, a triangle waveform, or a waveform with a pseudo random pattern.

The first emitting portion 70 and the second emitting portion 72 are light emitting diodes (LEDs). Alternatively, a laser diode (LD) that emits infrared light may be used as the light source 24. The light source 24 emits infrared light toward a specified region to illuminate the specified region. In this embodiment, the specified region is divided into a first sub-region R1 and a second sub-region R2. The first sub-region R1 and the second sub-region R2 are set not to overlap each other. The first emitting portion 70 is configured to illuminate only the first sub-region R1 and the second emitting portion 72 is configured to illuminate only the second sub-region R2.

In the present embodiment, the emitter controller 28 controls the first emitting portion 70 to emit the emitted light including a fundamental component (i.e., first-order harmonic component (N=1, an odd number)) at a fundamental frequency (e.g., 10 MHz). In contrast, the emitter controller 28 controls the second emitting portion 72 to emit the emitted light including the fundamental component and a second-order harmonic component (M=2, an even number) of the fundamental frequency at two times the fundamental frequency (e.g., 20 MHz).

The receiver controller 30 generates and outputs a plurality of control signals $D_N$ to the light receiver 26 to control a light receiving pattern (light exposure pattern) of the light receiver 26. More specifically, the receiver controller 30 outputs the control signals $D_N$ as a plurality of first control signals (particular control signals) $D1_N$ and a plurality of second control signals $D2_N$. Here, the plurality of first control signals $D1_N$ are output to the first receiving portion 74, thereby controlling the first receiving portion 74 to be simultaneously sensible to both the fundamental component and the second-order harmonic component of the reflected light. Furthermore, the receiver controller 30 outputs the plurality of second control signals $D2_N$ to the second receiving portion 76, thereby controlling the second receiving portion 76 to be simultaneously sensible to the fundamental component and the second-order harmonic component of the reflected light.

Figure 3:
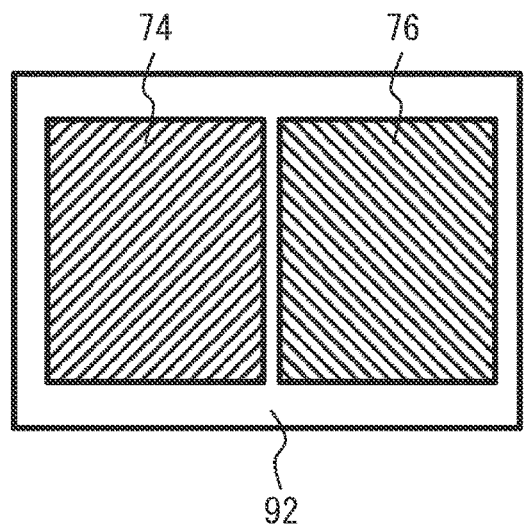
FIG. 3 is a plan view of a first receiving portion and a second receiving portion according to the first embodiment.

The light receiver 26 detects, as reflected light, the emitted light reflected by objects, such as a pedestrian 78 and another vehicle 80 illustrated in FIG. 1, within the specified region. As shown in FIG. 3, the first receiving portion 74 and the second receiving portion 76 are arranged on a single substrate 92 and are spaced away from each other. The first receiving portion 74 corresponds to the first emitting portion 70 and the second receiving portion 76 corresponds to the second emitting portion 72. In other words, the first receiving portion 74 is paired with the first emitting portion 70, and the second receiving portion 76 is paired with the second emitting portion 72.

The pair of the first receiving portion 74 and the first emitting portion 70 is configured to establish an optical relationship where the first receiving portion 74 only senses the reflected light reflected from the first sub-region R1, which is illuminated by first emitting portion 70. In other words, the first receiving portion 74 does not sense the reflected light directly reflected from the second sub-region R2, which is illuminated by the second emitting portion 72. Similarly, the pair of the second receiving portion 76 and the second emitting portion 72 is configured to establish an optical relationship where the second receiving portion 76 only senses the reflected light reflected from the second sub-region R2, which is illuminated by the second emitting portion 72. That is, the second receiving portion 76 does not sense the reflected light directly reflected from the first sub-region R1, which is illuminated by the first emitting portion 70.

When the emitted light emitted from the first emitting portion 70 directly reaches the pedestrian 78 in the first sub-region R1 without multipath interference as indicated by the solid line in FIG. 1, the reflected light reflected by the pedestrian 78 is sensed by only the first receiving portion 74, and the second receiving portion 76 is not able to sense the reflected light from the first sub-region R1. However, in a case where the other vehicle 80 enters into the second sub-region R2, if the emitted light emitted from the second emitting portion 72 is reflected by the other vehicle 80 toward the first sub-region R1, and then the reflected light is further reflected by the pedestrian 78, the multipath interference occurs as indicated by the broken line in FIG. 1. In this case, the first receiving portion 74 senses, in addition to the reflected light emitted from the first emitting portion 70, the reflected light emitted from the second emitting portion 72 due to the multipath interference. In other words, the multipath interference can be detected by controlling the first receiving portion 74 to be sensible to the fundamental component and the second-order harmonic component, as will be described later.

Figure 4:
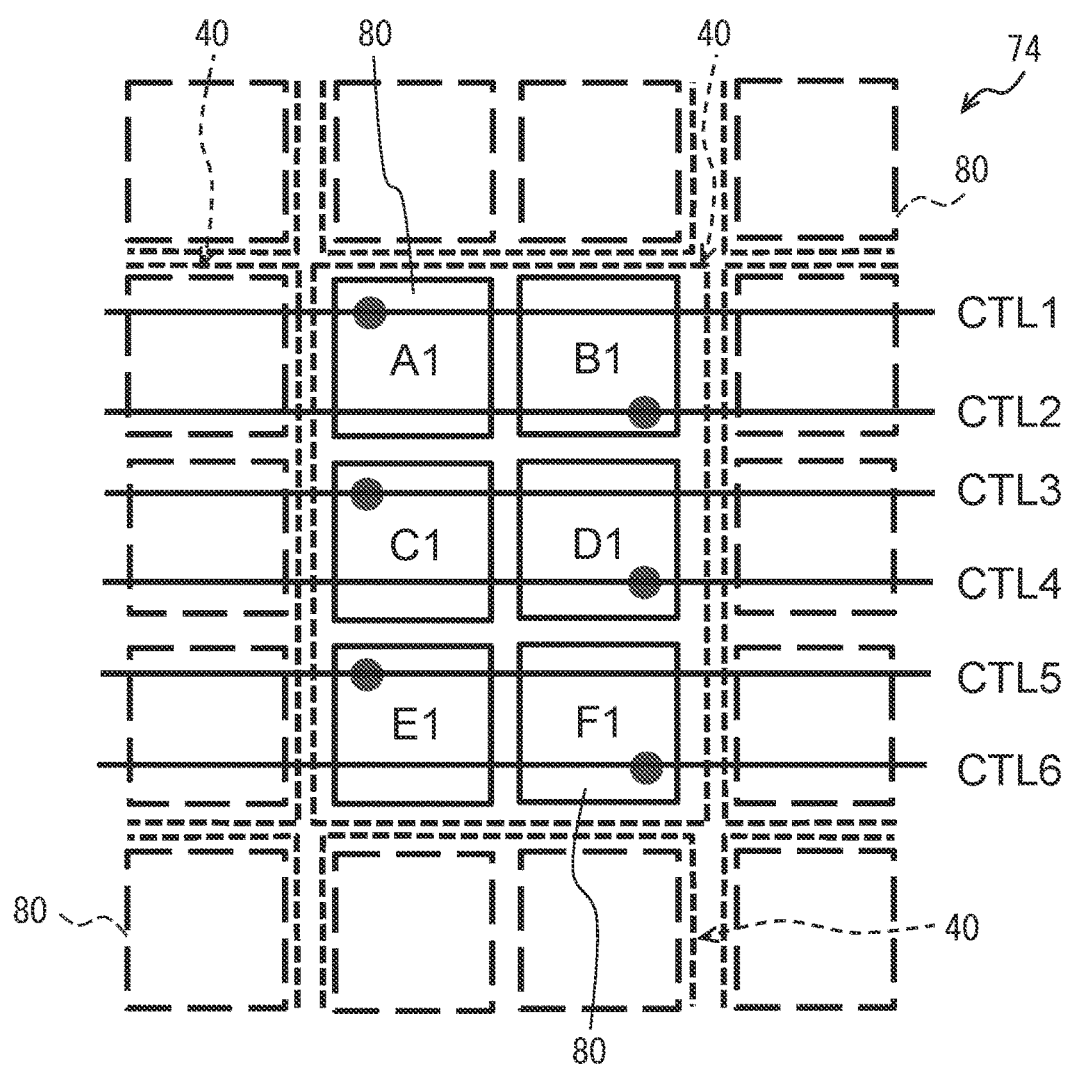
FIG. 4 is a plan view of pixel sensors according to the first embodiment.

The first receiving portion 74 and the second receiving portion 76 are formed of a plurality of sensing units 40 arranged in a regular array form. Specifically, the first receiving portion 74 includes a first group of sensing units 40, and the second receiving portion 76 includes a second group of sensing units 40. In addition, as shown in FIG. 4, each sensing unit 40 is formed of six individual pixel sensors 80. In other words, the first receiving portion 74 is physically formed of a first group of individual pixel sensors 80 (hereinafter, "first pixel sensors"), and similarly the second receiving portion 76 is physically formed of a second group of individual pixel sensors 80 (hereinafter, "second pixel sensors"). The following discussion will focus on a particular sensor unit 40 in each of the first receiving portion 74 and the second receiving portion 76. Specifically, the six pixel sensors 80 forming the particular sensor unit 40 in first receiving portion 74 will be referred to as first pixel sensors (particular photodetectors) A1 to F1. Similarly, the six pixel sensors 80 forming the particular sensor unit 40 in second receiving portion 76 will be referred to as second pixel sensors A2 to F2.

The receiver controller 30 controls each sensing unit 40 as a single unit. The receiver controller 30 outputs each of the first control signals $D1_N$ to a respective one of the first pixel sensors A1 to F1 through wiring CTL1 to CTL6. Similarly, the receiver controller 30 outputs each of the second control signals $D2_N$ to a respective one of the second pixel sensors A2 to F2. As will be described below, each control signal $D_N$ is a differential signal including a pair of normally complimentary gate signals TG1, TG2.

Figure 5:
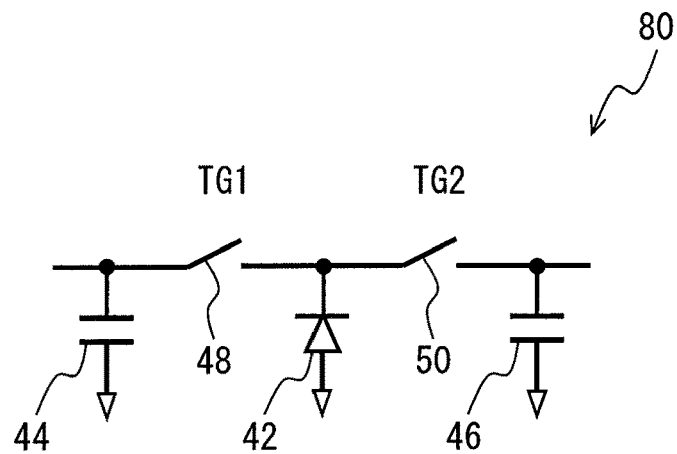
FIG. 5 is a schematic view of the pixel sensor according to the first embodiment.

The pixel sensor 80 is an image sensor using CMOS (Complementary Metal Oxide Semiconductor) technology or CCD (Charge Coupled Device) technology, or combination of both the technologies. As shown in FIG. 5, each pixel sensor 80 includes a PD (photo diode, photo element) 42, a first capacitor 44, a second capacitor 46, a first switch 48 and a second switch 50. The first switch 48 and the second switch 50 are a MOS-type device, such as a MOS transistor or a transfer gate, or a charge-coupled device (CCD). The first capacitor 44 and the second capacitor 46 are a capacitive element, such as MOS, CCD or MIM (Metal Insulator Metal). The first capacitor 44 is electrically connected to the first switch 48, and the first switch 48 is electrically connected to the PD 42. Therefore, the first capacitor 44 is electrically connected to the PD 42 through the first switch 48. Similarly, the second capacitor 46 is electrically connected to the second switch 50 and the second switch 50 is electrically connected to the PD 42. Therefore, the second capacitor 46 is electrically connected to the PD 42 through the second switch 50.

The PD 42 generates electricity while being exposed to the reflected light. The control signal $D_N$ received from the receiver controller 30 operates the pixel sensor 80 by controlling an on/off state of the first switch 48 and the second switch 50. As mentioned before, the control signal $D_N$ includes a pair of gate signals TG1, TG2 that are normally complimentary. For example, when the first switch 48 is on and the second switch 50 is off, the first capacitor 44 stores electric charge generated from the PD 42. On the other hand, when the first switch 48 is off and the second switch 50 is on, the second capacitor 46 stores electric charge generated from the PD 42. Although two switch/capacitor pairs (i.e., the first switch 48 and the first capacitor 44, and the second switch 50 and the second capacitor 46) are used in the present embodiment, three or more switch/capacitor pairs may be used. The electric charge stored in the first capacitor 44 and the electric charge stored in the second capacitor 46 are separately output to the common-mode choke 32 as analog data.

The common-mode choke 32 is used to avoid light saturation by removing common mode (CM) components from the data output from the pixel sensor 80. The CM components are generated when light saturation occurs, i.e., when sufficiently high background light exists in the scene. After removing the CM component, the data corresponding to the first capacitor 44 and the data corresponding to the second capacitor 46 are input into the differential amplifier 34. The differential amplifier 34 outputs the difference value between each pair of the electric charge data to the A/D converter 36. That is, the difference value between the data corresponding to the electric charge stored in the first capacitor 44 and the data corresponding to the electric charge stored in the second capacitor 46 are output from the differential amplifier 34.

The A/D converter 36 converts the analog data from the differential amplifier 34 to digital data and outputs the digital data to the processing unit 38. The processing unit 38 includes a CPU, a ROM, a RAM or the like, and performs programs stored in the ROM to execute a variety of processing. Especially, the processing unit 38 calculates a distance to an object based on the digital data output from the A/D converter 36. Further, the processing unit 38 detects occurrence of a multipath error based on the digital data (i.e., the reflected light).

(Simultaneous Sensing of 1st and 2nd Order Harmonic Components)

Next, the distance calculation mechanism of TOF technology will be explained in detail. For ease of understanding, an explanation will be first given with reference to a basic TOF distance sensor implementation.

(General Principle of TOF Measuring)

Figure 6:
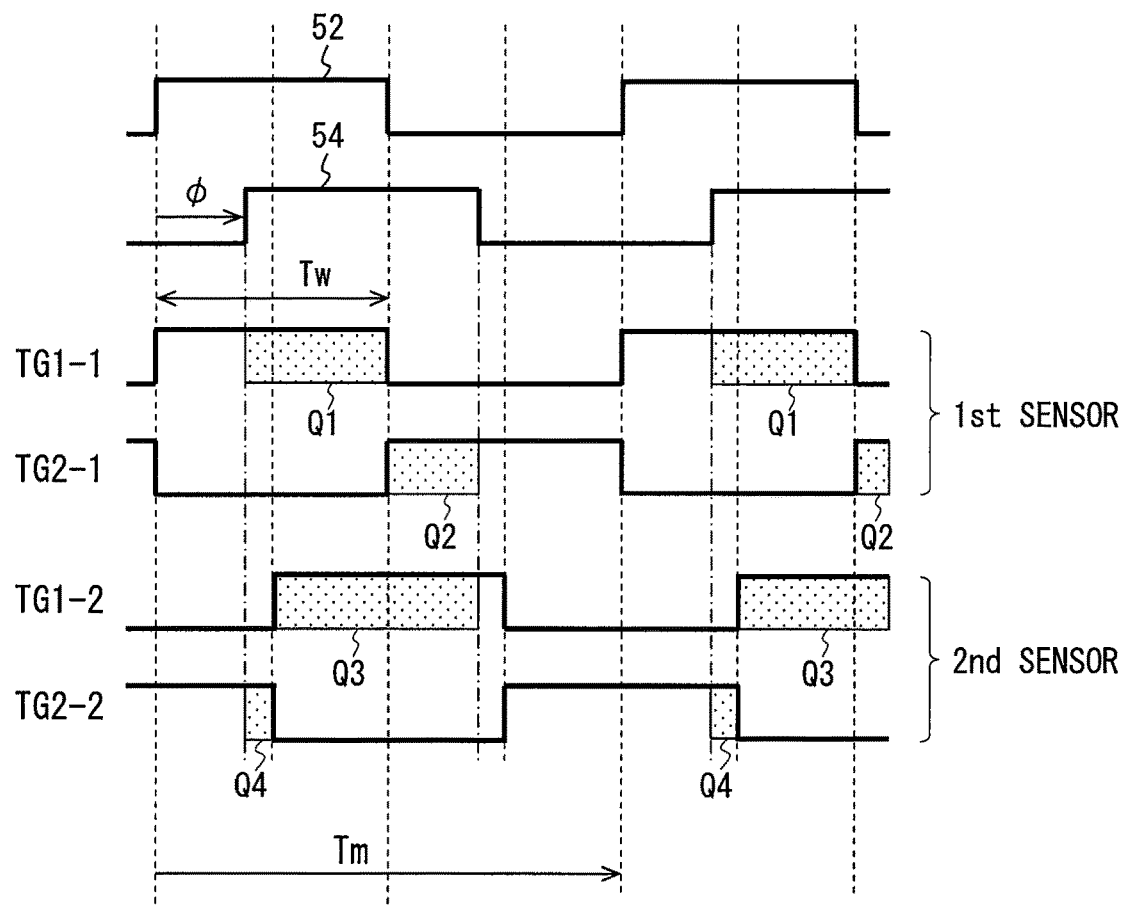
FIG. 6 is one example of a signal sequence of control signals.

FIG. 6 shows one example of a signal sequence (modulation cycle: Tm, exposure period: Tw) where the emitted light has a 50% duty cycle and two pixel sensors (hereinafter, a "first pixel sensor" and a "second pixel sensor") 80 are controlled through the gate signals TG1, TG2 having a different phase from each other. As shown in FIG. 6, the first pixel sensor 80 is first controlled through a first pair of gate signals TG1-1, TG2-1, and the second pixel sensor 80 is controlled through a second pair of gate signals TG1-2, TG2-2. In other words, four samplings are executed in this model. The waveform (emitted light waveform 52) of the emitted light from the light source 24 is a square form in synchronism with the gate signals TG1, TG2.

The waveform (reflected light waveform 54) of the reflected light has a time difference relative to the emitted light waveform 52, and thus the reflected light waveform 54 is sensed as a waveform having a phase delay with a phase difference φ relative to the emitted light waveform 52. The first pair of gate signals TG1-1, TG2-1 has a phase difference of 180° from each other, and the second pair of gate signals TG1-2, TG2-2 has a phase difference of 180° from each other. Further, the first pair of gate signals TG1-1, TG2-1 and the second pair of gate signals TG1-2, TG2-2 have a phase difference of 90° from each other.

In this example, the gate signals TG1-1, TG2-1 are output to the first pixel sensor 80 for several to hundreds of thousands of cycles. The gate signals TG1-2, TG2-2 are also output to the second pixel sensor 80 for several to hundreds of thousands of cycles. The electric charges generated by the first pair of gate signals TG1-1, TG2-1 are obtained as data Q1, Q2, while the electric charges generated by the second pair gate signals TG1-2, TG2-2 are obtained as data Q3, Q4. Specifically, the data is a voltage value that is a converted value of the electric charge through electric charge voltage conversion. Then, an estimation value θ of the phase difference φ can be calculated by equation (1) using the discrete Fourier transform (DFT) with the data Q1 to Q4 obtained through the four samplings.

$$\theta = \tan^{-1}((Q1-Q3)/(Q2-Q4)) \quad (1)$$

Although, the equation (1) represents an equation when four samplings are executed, the equation (1) can be generalized as to N phases (i.e., N samplings) as represented in equation (2).

$$\theta = \tan^{-1}((\Sigma Qk^* \sin(2\pi/N^*k)/(\Sigma Qk^* \cos(2\pi/N^*k))) \quad (2)$$

Thereafter, a distance to an object can be calculated based on a relationship between θ and the speed of light.

(General Explanation of Differential Signal Sequence)

Figure 7:
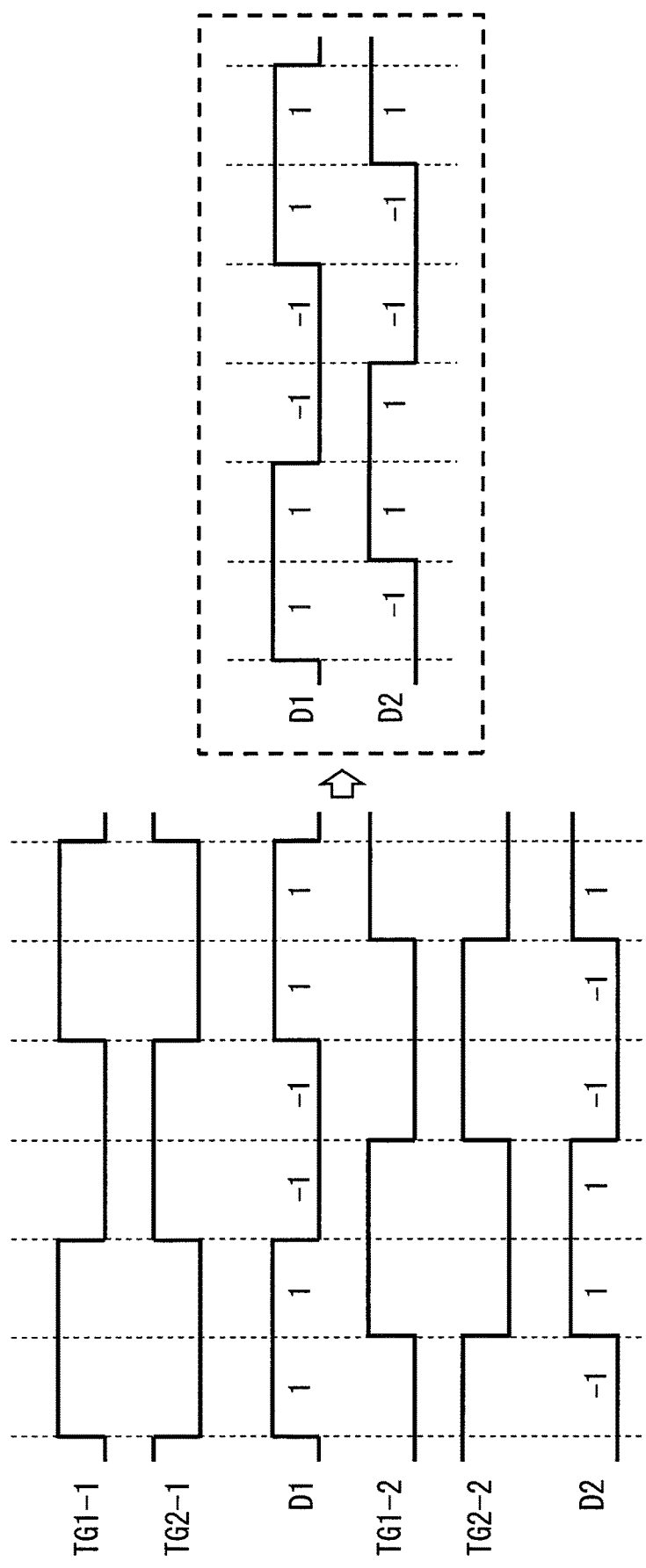
FIG. 7 is one example of a differential signal sequence.

The first pair of gate signals TG1-1, TG2-1 and the second pair of gate signals TG1-2, TG2-2 can be represented by respective differential signals $D_1$, $D_2$, as shown in FIG. 7. It should be noted that the differential signal $D_1$, $D_2$ is an imaginary signal that indicates the state of the pair of gate signals TG1, TG2. As mentioned previously, the gate signals TG1, TG2 are normally complimentary. Thus, in FIG. 7, the differential signal $D_1$, $D_2$ has a value of "1" when a first gate signal TG1 is "H" and a second gate signal TG2 is "L". In other words, when the differential signal $D_1$, $D_2$ has the value "1", the on/off state of the first switch 48 and the second switch 50 is a first state where the first switch 48 is on and the second switch 50 is off.

In contrast, the differential signal $D_1$, $D_2$ has the value of "−1" when the first gate signal is "L" and the second gate signal is "H". In other words, when the differential signal $D_1$, $D_2$ has the value "−1", the on/off state of the first switch 48 and the second switch 50 is a second state where the first switch 48 is off and the second switch 50 is on. Therefore, the state of the pair of gate signals TG1, TG2 (i.e., the on/off state of the first and second switches 48, 50) can be represented by a differential signal (control signal $D_N$) that is normally either "1" or "−1".

(Emitted Light in Present Embodiment)

As explained previously, a multipath error can be detected when the first receiving portion 74 senses the fundamental component and its second-order harmonic component. In order to simultaneously sense the reflected light at both the fundamental component and the second-order harmonic component, (i) the second emitting portion 72 is controlled to emit the emitted light including the fundamental component and its second-order harmonic component at a duty cycle of less than 50% and (ii) the first control signals $D1_N$ are generated such that the first receiving portion 74 simultaneously senses sensitive to the second-order harmonic component as well as the fundamental component. Furthermore, to sense, by the first receiving portion 74, only the fundamental component of the reflected light when multipath interference does not arise, the first emitting portion 70 is controlled to emit the emitted light including the fundamental component at a duty cycle of 50%.

Figure 8:
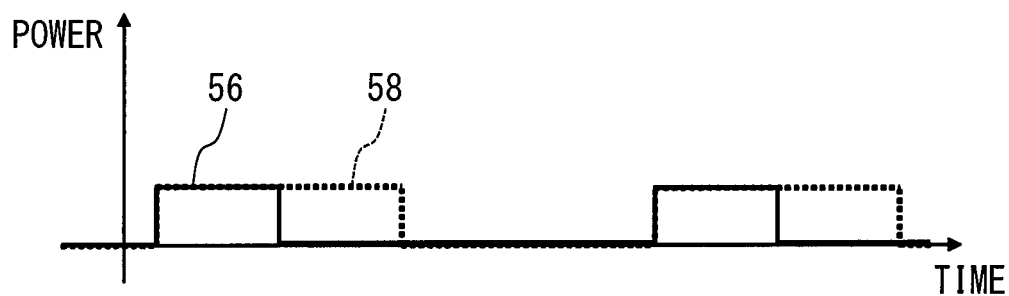
FIG. 8 is emitted light at a 25% duty cycle according to the first embodiment.

That is, although the emitted light described in the basic implementation of FIG. 6 has a 50% duty cycle, the emitter controller 28 in the present embodiment controls the second emitting portion 72 to emit the emitted light having a duty cycle of less than 50%. For example, the emitted light from the second emitting portion 72 may have a duty cycle of 25%. By setting the emitted light to have a 25% duty cycle, the second-order harmonic component can be effectively sensed as described below. FIG. 8 shows the emitted light 56 of the second emitting portion 72 having a 25% duty cycle in the present embodiment indicated by the solid line and a comparative emitted light 58 having a 50% duty cycle indicated by the broken line.

Figure 9:
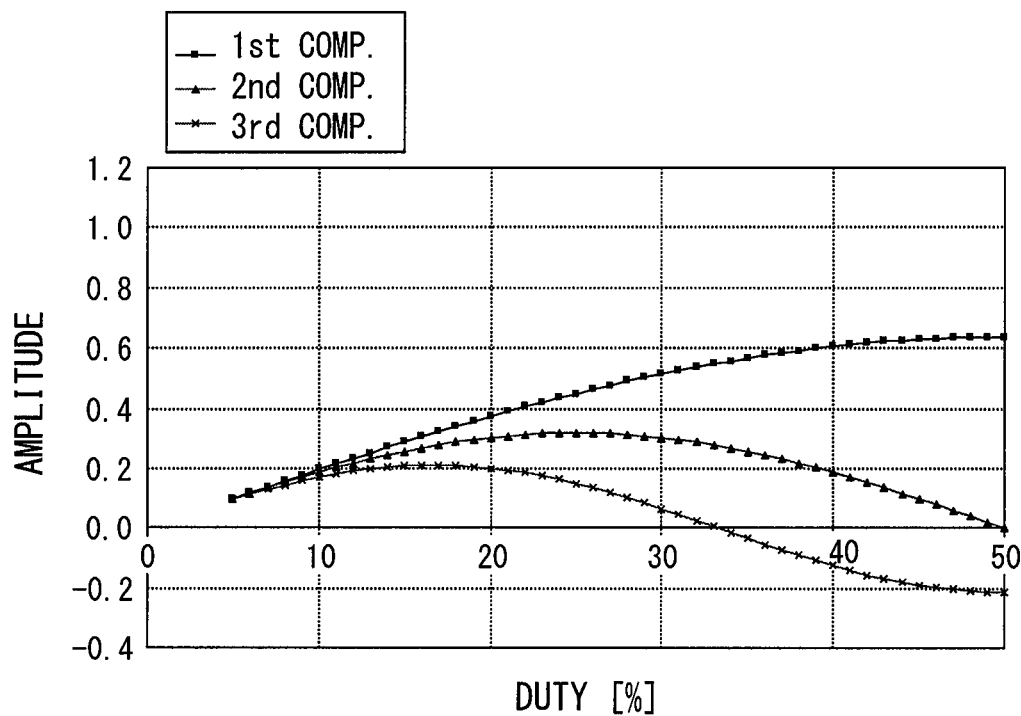
FIG. 9 is a graph showing a relation between amplitude and a duty cycle for a fundamental component, a second-order harmonic component and a third-order harmonic component.

FIG. 9 shows a relation between amplitude and a duty cycle [%] for the fundamental component, the second-order harmonic component, and the third-order harmonic component. As shown in FIG. 9, the amplitude of the second-order harmonic component and the third-order harmonic component gradually increase as the duty cycle decreases from 50%. Especially, the amplitude of the second-order harmonic component has a maximum value at a duty cycle of 25%. Therefore, by setting the emitted light of the second emitting portion 72 to have a 25% duty cycle in the present embodiment, the amplitude of the second-order harmonic component can be sensitively detected by the second receiving portion 76 (and also detected by the first receiving portion 74 if multipath interference arises). However, it should be understood that the duty cycle is not limited to 25%. As shown in FIG. 9, the amplitude of the second-order component and the third-order component are positive at duty cycles other than 25%. For example, if the emitted light includes the third-order harmonic component, the duty cycle may be set to, e.g., about 18% at which the third-order harmonic component has a maximum value.

In contrast, the first emitting portion 70 is controlled to emit the emitted light including the fundamental component at a 50% duty cycle, as described above. As shown in FIG. 9, the second-order harmonic component is 0 at a duty cycle of 50%, whereas the fundamental component has a maximum value at a duty cycle of 50%. Therefore, by setting the emitted light of the first emitting portion 70 to have a duty cycle of 50%, the first receiving portion 74 sensitively senses the fundamental component of the reflected light emitted from the first emitting portion 70, whereas the first receiving portion 74 does not sense the second-order harmonic component of the reflected light emitted from the first emitting portion 70 when multipath interference does not exist. In other words, the first receiving portion 74 senses the second-order harmonic component of the reflected light, which is emitted from the second emitting portion 72 at a 25% duty cycle, only when a multipath error occurs.

(Control Signal in Present Embodiment)

In the present embodiment, the receiver controller 30 generates and transmits each of the plurality of control signals $D_N$ to respective ones of the plurality of pixel sensors 80. Although the control signals $D_N$ are described as differential signals of the gate signals TG1, TG2 for the first switch 48 and the second switch 50 in the subsequent description, the differential signal is a representative signal that is physically implemented as a pair of normally complementary gate signals TG1, TG2 as explained previously. As with the description in FIG. 7, the control signal $D_N$ as shown in FIG. 10 in the present embodiment switches the on/off state of the first and the second switches 48, 50 between the first state indicated by "1" and the second state indicated by "−1".

Figure 10:
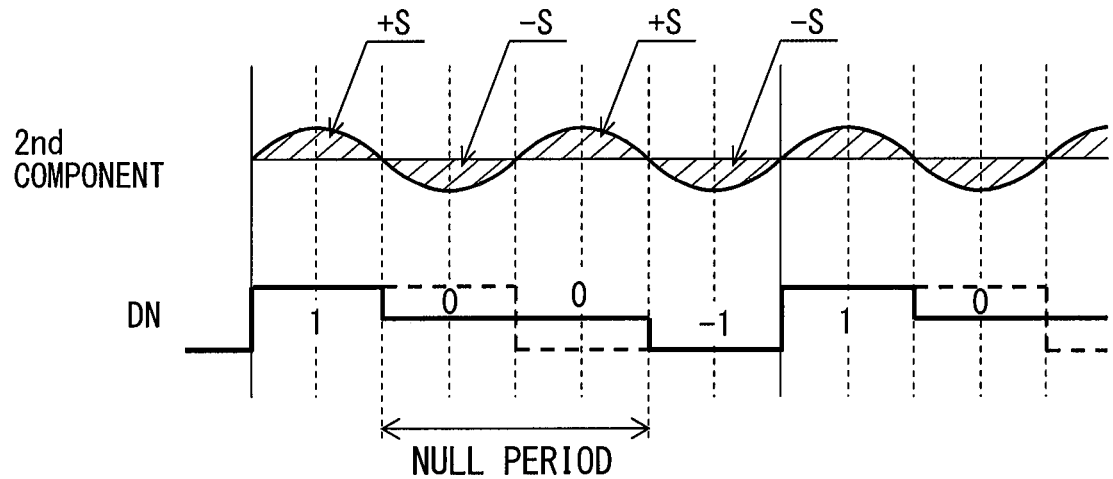
FIG. 10 is one example of a control signal and a second-order harmonic component of reflected light according to the first embodiment.

Furthermore, to simultaneously sense the fundamental component and the second-order harmonic component of the reflected light, the receiver controller 30 generates the control signal $D_N$ (the first controls signals $D1_N$ and the second control signals $D2_N$) to have a value of "0", which represents a null period, as shown in FIG. 10. If only the first period and the second period exist as indicated by the broken line in FIG. 10, the integrated value of the second-order harmonic component during the first state (i.e., when $D_N$ is "1") is 0 (i.e., +S+(−S)=0). Similarly, the integrated value of the second-order harmonic component during the second state (i.e., when $D_N$ is "−1") is also 0 (i.e., −[+S+(−S)]=0). Therefore, when the null period does not exist, the integrated value of the second-order harmonic component for each of the first state and the second state of the control signal $D_N$ is zero, and therefore the second-order harmonic component would not be sensed. In contrast, by setting the null period as indicated by the solid line in FIG. 10, the integrated value of the second-order harmonic component during the null period is not considered. In this case, the integrated value of the second-order harmonic component during the first state is calculated as "+S", whereas the integrated value of the second-order harmonic component during the second state is calculated as "−S". In other words, the integrated value of the second-order harmonic component during the first state and the second state is calculated as a non-zero value. As a result, the second-order harmonic component can be sensed in addition to the fundamental component by introducing the null period in the control signal $D_N$.

In the present embodiment, the control signal $D_N$ has a value of "0" (i.e., the null period) when the first and second gate signals TG1, TG2, which are normally complimentary, are both set to be "H". In other words, when the control signal $D_N$ has the value "0", the on/off state of the first switch 48 and the second switch 50 is a third state where the first switch 48 is on and the second switch 50 is on. Furthermore, the control signal $D_N$ is generated such that the third state occurs between the first state and the second state.

More specifically, the third state (the null period) is inserted from 1/2π to 3/2π phase (i.e., 90° to 270°) in one cycle of the control signal $D_N$ as shown in FIG. 10. In other words, one cycle of the control signal $D_N$ is formed of the first state ("1") from 0 to 1/2π phase, the third state ("0") from 1/2π to 3/2π phase, and the second state ("−1") from 3/2π to 2π phase.

Figure 11:
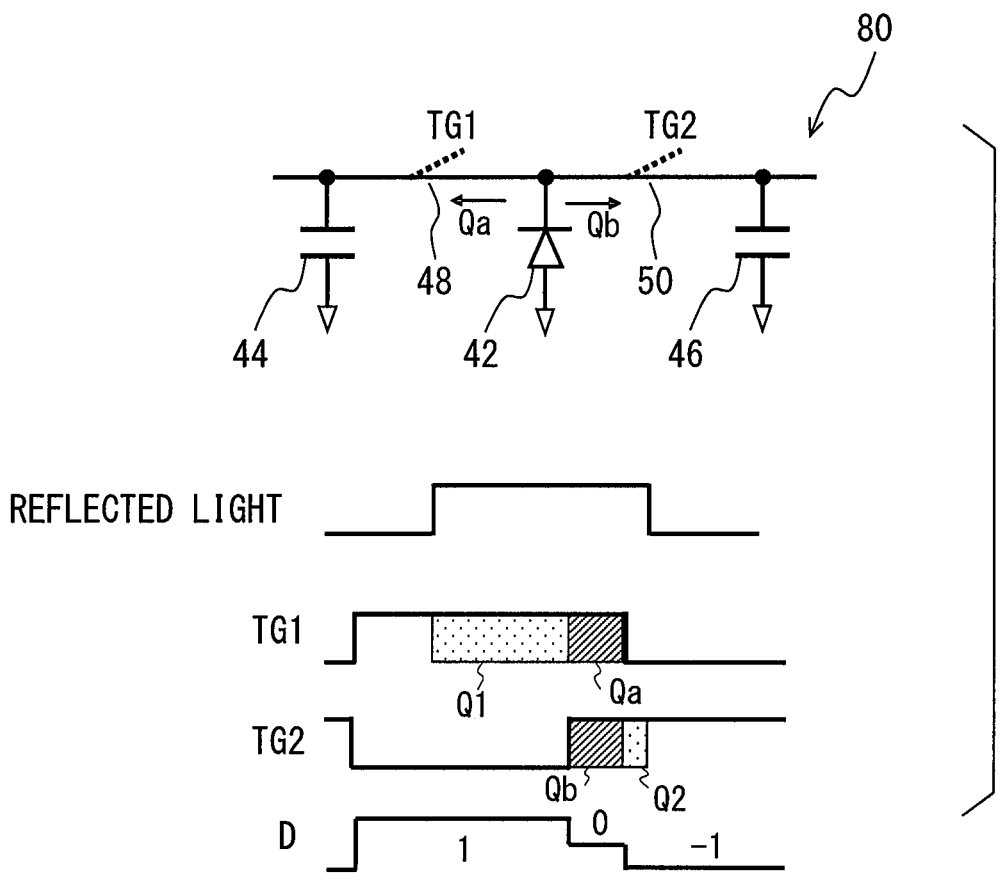
FIG. 11 is a schematic view of one pixel sensor when the pixel sensor is in a third state.

As shown in FIG. 11, the electricity generated from the PD 42 is evenly distributed to the first capacitor 44 and the second capacitor 46 during the third state. Thus, the first capacitor 44 stores the electric charge Qa and the second capacitor 46 stores the electric charge Qb that is equal to Qa during the third state (i.e., the null period). Therefore, the electric charges Qa and Qb stored during the third state are cancelled through the common-mode choke 32 and the differential amplifier 34. By cancelling the electric charges Qa and Qb, the data output from the differential amplifier 34 can include information associated with the second-order harmonic component. Hence, if the reflected light includes both the fundamental component and the second-order harmonic component, the data associated with the fundamental component and the second-order component can be simultaneously obtained. It should be noted that, although the first receiving portion 74 is controlled to be sensible to both the fundamental component and the second-order harmonic component, the first receiving portion 74 senses only the fundamental component of the reflected light emitted from the first emitting portion 70 when there is no multipath interference.

Figure 12:
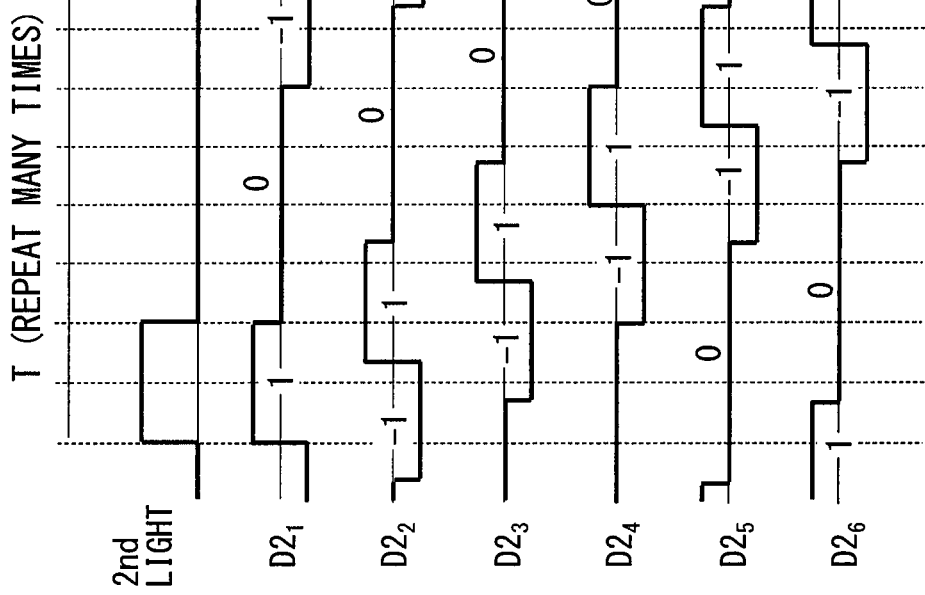
FIG. 12 (a) is the differential sequence of the first control signals and FIG. 12 (b) is the differential sequence of the second control signals.
Figure 12:
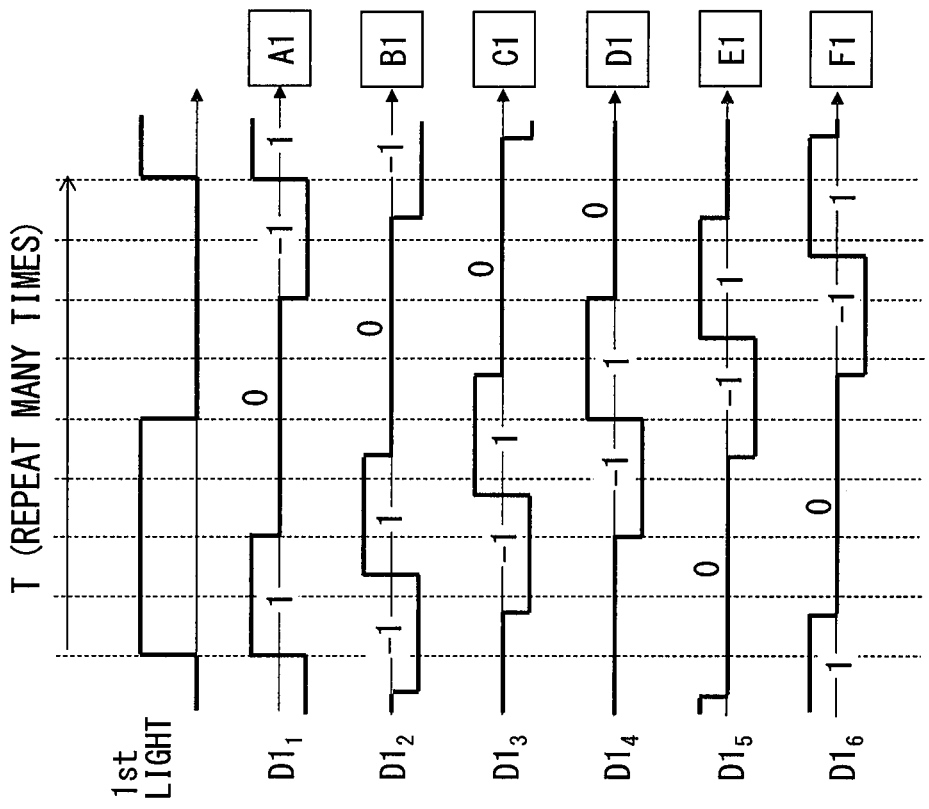

FIG. 12 shows a differential signal sequence for one sensing unit 40 of six first pixel sensors A1 to F1 (FIG. 12 (a)) and a differential sequence for one sensing unit 40 of six second pixel sensors A2 to F2 (FIG. 12 (b)). As shown in FIG. 12, the first control signals are formed of six different types of signals $D1_1$ to $D1_6$ having a different phase from each other and the second control signals are formed of six different types of signals D21 to D26 having a different phase from each other. More specifically, the signals $D1_1$ to $D1_6$ have a phase difference of, for example, 60° from each other, and the signals $D2_1$ to $D2_6$ have a phase difference of, for example, 60° from each other. Further, the first control signals $D1_1$ to $D1_6$ and the second control signals $D2_1$ to $D2_6$ are the same phase, respectively.

The receiver controller 30 outputs, at substantially the same time, the six different types of signals $D1_1$ to $D1_6$ to the six first pixel sensors A1 to F1 and the six different types of signals $D2_1$ to $D2_6$ to the six second pixel sensors A2 to F2. The signals $D1_1$ to $D1_6$ and $D2_1$ to D26 are output for several hundreds to thousands of cycles. Each pixel sensor A1 to F1 and A2 to F2 receives a respective one of the six different signals D11 to $D1_6$, $D2_1$ to $D2_6$. In other words, each pixel sensor A1 to F1, A2 to F2 in one sensing unit 40 is controlled by a different phase, and thus outputs electric charge data having a different value. It should be noted that the receiver controller 30 outputs the same subset of the six different types of signals $D1_1$ to $D1_6$ to each sensing unit 40 of the first receiving portion 74 and the same subset of the six different types of signals $D2_1$ to $D2_6$ to each sensing unit 40 of the second receiving portion 76. Hence, each sensing unit 40 is controlled to sense the reflected light with the same light sensing pattern as another sensing unit 40.

(Calculation at Processing Unit)

Figure 13:
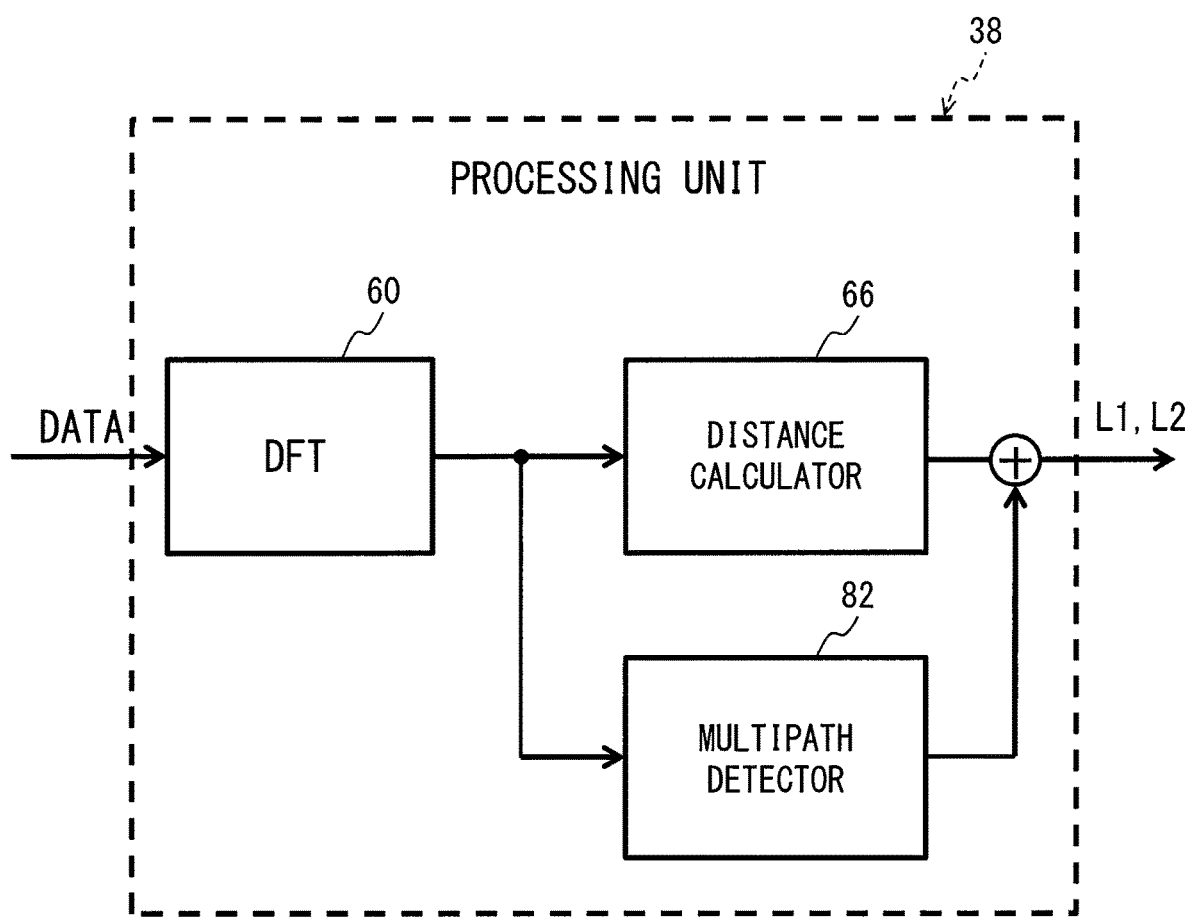
FIG. 13 is a block diagram of a processing unit according to the first embodiment.

As shown in FIG. 13, the processing unit includes a discrete Fourier transform circuit (DFT) 60, a distance calculator 66, and a multipath detector 82. The DFT 60 decomposes the data output from the A/D converter 36 into the fundamental component and the second-order component and calculates real parts and imaginary parts of the fundamental component and the second-order harmonic component. More specifically, the DFT 60 decomposes the data corresponding to the first control signals $D1_1$ to $D1_6$ into the fundamental component and, if any, the second-order harmonic component and calculates the real parts and the imaginary parts thereof. Further, the DFT 60 decomposes the data corresponding to the second control signals D21 to D26 into the fundamental component and the second-order harmonic component and calculates the real parts and the imaginary parts thereof. The calculated values by the DFT 60 are output to the distance calculator 66 and the multipath detector 82.

The distance calculator 66 calculates a distance to an object based on the calculated values by the DFT 60. Specifically, the distance calculator 66 calculates a phase angle $\theta_1$ (in other words, an estimation value of a phase difference) of the fundamental component based on the real parts and the imaginary parts corresponding to the first control signals $D1_1$ to $D1_6$ (refer to the equation (2)). Then, the distance calculator 66 calculates a distance L1 to an object within the first sub-region R1 (such as the pedestrian 78 in FIG. 1) based on the phase angle $\theta_1$. More specifically, the distance calculator 66 calculates L1 derived from the phase angle $\theta_1$ by equation (3), where c is the speed of light and $f_1$ is the frequency of the fundamental component.

$$L1 = (1/2)(c/f_1)(\theta_1/2\pi) \quad (3)$$

In regards to the second sub-region R2, the distance calculator 66 calculates a first phase angle $\theta_2 1$ (in other words, an estimation value of a phase difference) of the fundamental component and a second phase angle $\theta_2 2$ (in other words, an estimation value of a phase difference) of the second-harmonic component based on the real parts and the imaginary parts corresponding to the second control signals $D2_1$ to $D2_6$ (refer to the equation (2)). Then, the distance calculator 66 calculates a distance L2 to an object within the second sub-region R2 (such as the other vehicle 80) based on the first phase angle $\theta_2 1$ and the second phase angle $\theta_2 2$. More specifically, the distance calculator 66 calculates L2-1 derived from the first phase angle $\theta_2 1$ by equation (4).

$$L2\text{-}1 = (1/2)(c/f_1)(\theta_2 1/2\pi) \quad (4)$$

Similarly, the distance calculator 66 calculates L2-2 derived from the second phase angle $\theta_2 2$ by equation (5), where $f_2$ is the frequency of the second-order harmonic component, i.e., $f_2 = 2f_1$.

$$\begin{aligned} L2-2 &= (1/2)(c/f_2)(\theta_2 2/2\pi) \quad (5)\\ &= (1/2)(c/2f_1)(\theta_2 2/2\pi)\\ &= (1/2)(c/f_2)(\theta_2 2/2/2\pi) \end{aligned}$$

Then, the distance calculator 66 obtains the distance L2 by, for example, linearly combining L2-1 and L2-2, i.e., a linear combination.

The multipath detector 82 detects occurrence of a multipath error based on the calculated values output from the DFT 60. In the present embodiment, the multipath detector 82 determines whether a multipath error occurs as to an object within the first sub-region R1 (i.e., the pedestrian 78). In other words, the first sub-region R1 is a target region for detecting occurrence of a multipath error. When the multipath detector 82 receives the calculated values of the fundamental component and the second-order harmonic component corresponding to the first control signals $D1_1$ to $D1_6$ from the DFT 60, in other words, the first receiving portion 74 senses the fundamental component and the second-order harmonic component, the multipath detector 82 detects occurrence of a multipath error in the first sub-region R1. In this case, the distance L1 calculated by equation (3) includes an error value arising from the multipath error. Therefore, the processing unit 38 may cancel the distance L1, or correct the distance L1. On the contrary, when the DFT 60 receives only the calculated value of the fundamental component from the DFT 60, the multipath detector 82 determines that a multipath error did not occur in the first sub-region R1.

As described above, the first emitting portion 70 is controlled to emit the emitted light including the fundamental component at a 50% duty cycle and the second emitting portion 72 is controlled to emit the emitted light including the fundamental component and the second-order harmonic component at a 25% duty cycle. The control signals $D_N$ are generated such that the first receiving portion 74 can simultaneously sense the fundamental component and the second-order harmonic component. Therefore, if multipath interference occurs as illustrated in FIG. 1, the first receiving portion 74 simultaneously senses the fundamental component of the reflected light emitted from the first emitting portion 70 (see the solid line in FIG. 1) and the fundamental component and the second-order harmonic component of the reflected light emitted from the second emitting portion 72 (see the broken line in FIG. 1). Accordingly, the multipath detector 82 can detect the occurrence of the multipath error without a time lag. In other words, since the multipath error is timely detected, the accuracy of the distance value calculated by the TOF device 20 can be increased.

Furthermore, as to the second sub-region R2, the second receiving portion 76 can also simultaneously sense the fundamental component and the second-order harmonic component of the reflected light emitted from the second emitting portion 72. In other words, the second receiving portion 76 senses both the fundamental component and the second-order component without a time lag. Therefore, the accuracy of the distance value for an object within the second sub-region R2 calculated by the TOF device 20 can be improved.

Second Embodiment

Figure 14:
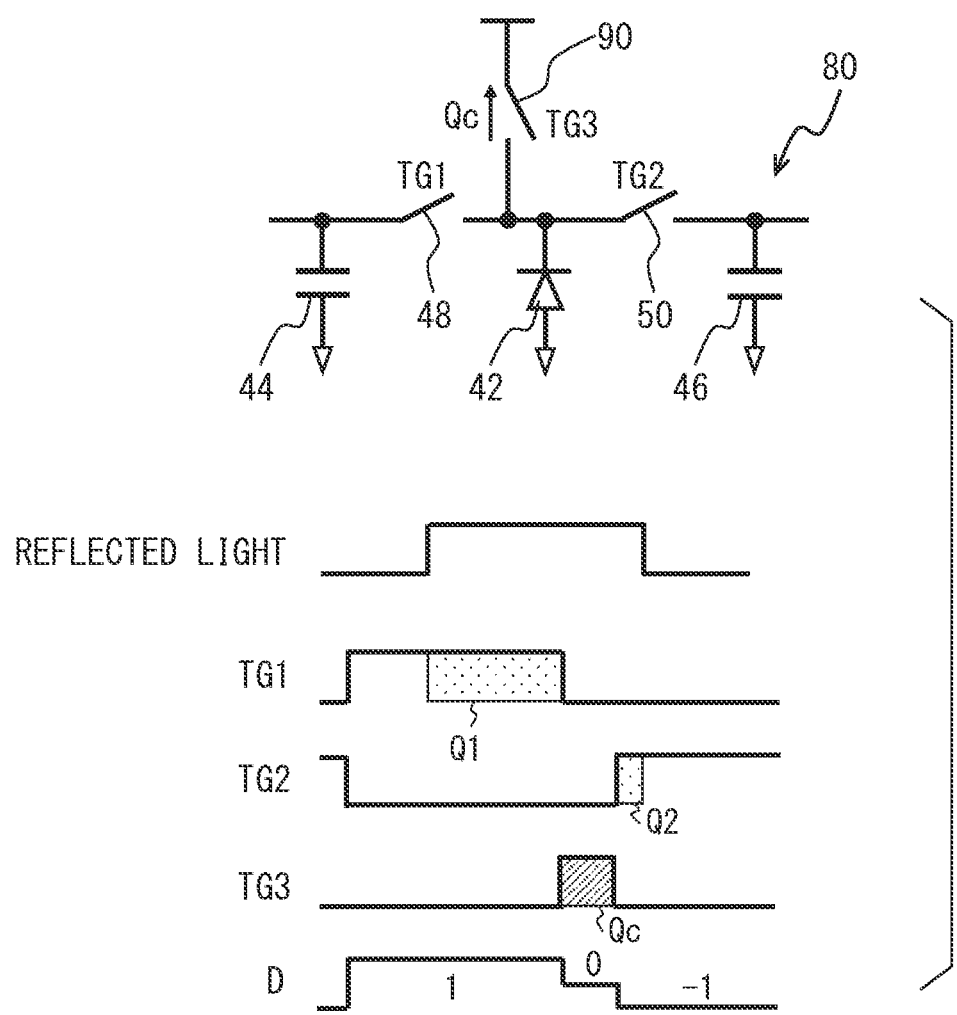
FIG. 14 is a schematic view of one pixel sensor when the pixel sensor is in the third state according to a second embodiment.

Next, a TOF device 20 according to the second embodiment will be described below. In the first embodiment, the third state (i.e., the null period) of the control signal $D_N$ is defined as a state where the first switch 48 and the second switch 50 are both on. In the second embodiment, however, the third state of the control signal $D_N$ is defined as a state where the first switch 48 and the second switch 50 are both off, as shown in FIG. 14. Furthermore, each pixel sensor 80 further includes a sub switch 90 that is electrically connected between the PD 42 and a discharge target (not shown).

The sub switch 90 is controlled by a sub gate signal TG3 output from the receiver controller 30 such that the sub switch 90 is off during the first state (i.e., "1") and the second state (i.e., "−1") and is on during the third state (i.e., "0"). Thus, electricity (Qc) generated during the third state is discharged through the sub switch 90 without being stored in the first capacitor 44 and the second capacitor 46. Accordingly, the electricity during the third state is not output from the pixel sensor 80, and thus data associated with the electricity generated during the third state is not used in the processing unit. As a result, the fundamental component and the second-order harmonic component can be simultaneously sensed, as with the first embodiment.

Third Embodiment

Figure 15:
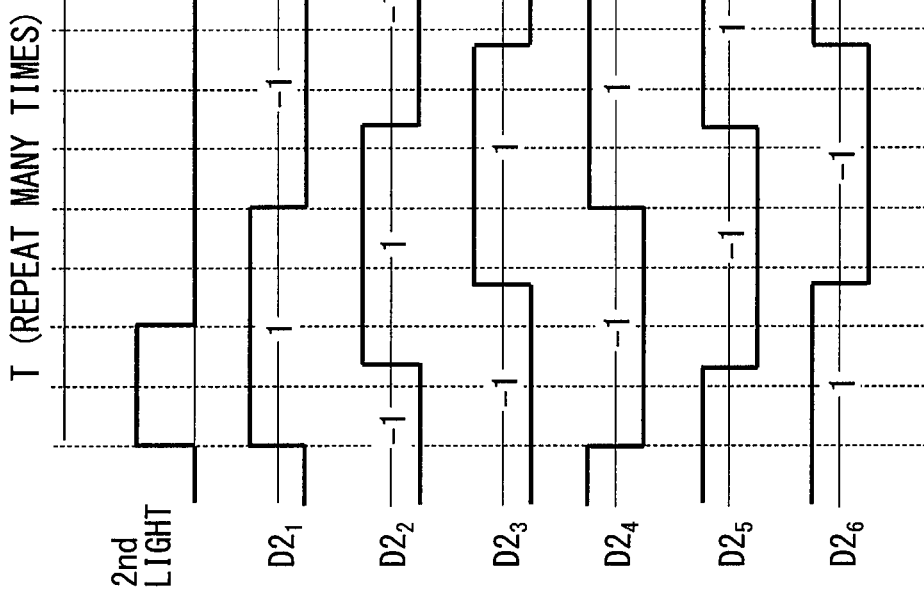
FIG. 15 (a) is the differential sequence of the first control signals and FIG. 15 (b) is the differential sequence of the second control signals according to a third embodiment.
Figure 15:
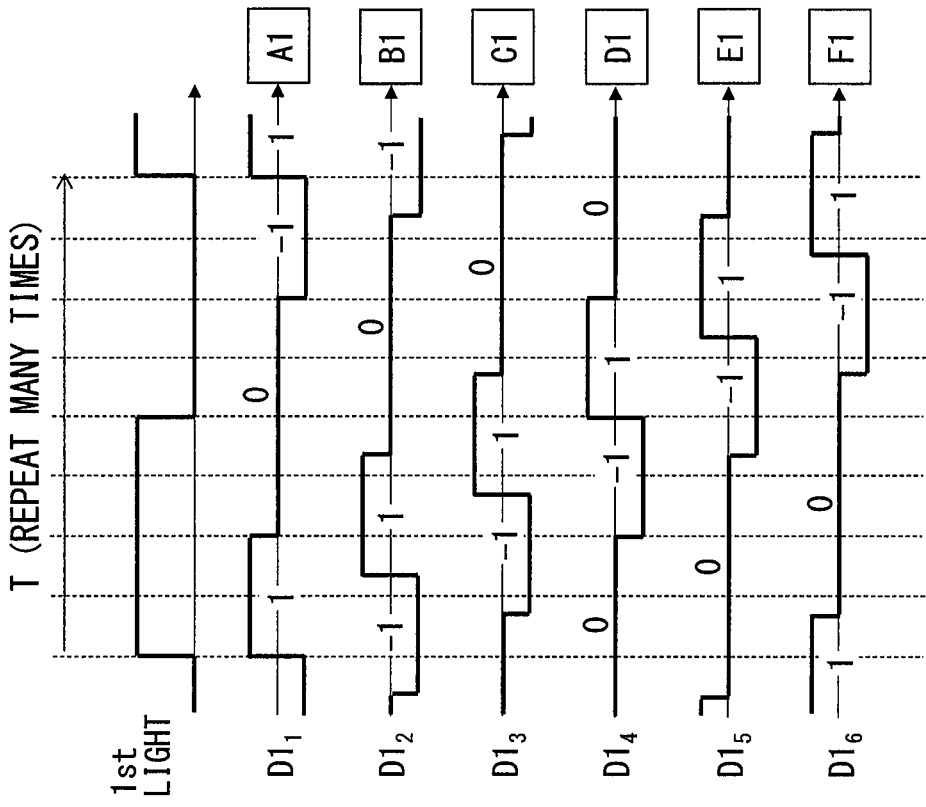

In the first embodiment, the second receiving portion 76 is controlled to be sensible to both the fundamental component and the second-order component of the reflected light, in other words, the second controls signals $D2_N$ have the third state. However, for the purpose of detecting a multipath error in the first sub-region R1, the second receiver may not necessarily detect the second-order harmonic component of the reflected light emitted from the second emitting portion 72. In view of the above, the second receiving portion 76 according to the third embodiment is controlled to sense only the fundamental component. Specifically, as shown in FIG. 15, the second control signals D21 to D26 have the first state "1" and the second state "−1" but do not have the third state "0" (see FIG. 15 (b)). In contrast, the first receiving portion 74 is controlled to be sensible to the fundamental component and the second-order harmonic component. Thus, as with the first embodiment, the first control signals D11 to D16 have the first to third states "1", "−1", "0" (see FIG. 15 (a)).

In the third embodiment, although the second emitting portion 72 emits the emitted light including the fundamental component and the second-order harmonic component, the second receiving portion 76 senses only the fundamental component of the reflected light. Thus, the processing unit calculates the distance value L2 based on the fundamental component of the reflected light. As a result, an S/N (signal-noise ratio) as to the second receiving portion 76 can be improved.

In the above-described embodiments, the second emitting portion 72 emits the emitted light including the fundamental component and the second-order harmonic component, and when the first receiving portion 74 senses the fundamental component and the second-order harmonic component, the multipath detector 82 detects occurrence of a multipath error. However, as far as the second emitting portion 72 emits the emitted light including a different-order harmonic component from the emitted light of the first emitting portion 70, the second emitting portion 72 may emit the reflected light including another harmonic component. For example, the second emitting portion 72 may be controlled to emit the emitted light including the fundamental component and the third-order harmonic component (M=3, an odd number) and the first emitting portion 70 may be controlled to emit the emitted light including the fundamental component. The first receiving portion 74 may be controlled to be sensible to the fundamental component and the third-order harmonic component. In this case, since the third-harmonic order component is an odd number order, the second emitting portion 24 is controlled to emit the emitted light at a 50% duty cycle (refer to FIG. 9). Furthermore, the first control signals do not have the third state such that the first receiving portion 74 detects the third-order harmonic component. If the first receiving portion 74 senses both the fundamental component and the third-order harmonic component, the multipath detector 82 may detect occurrence of a multipath error.

Fourth Embodiment

Figure 16:
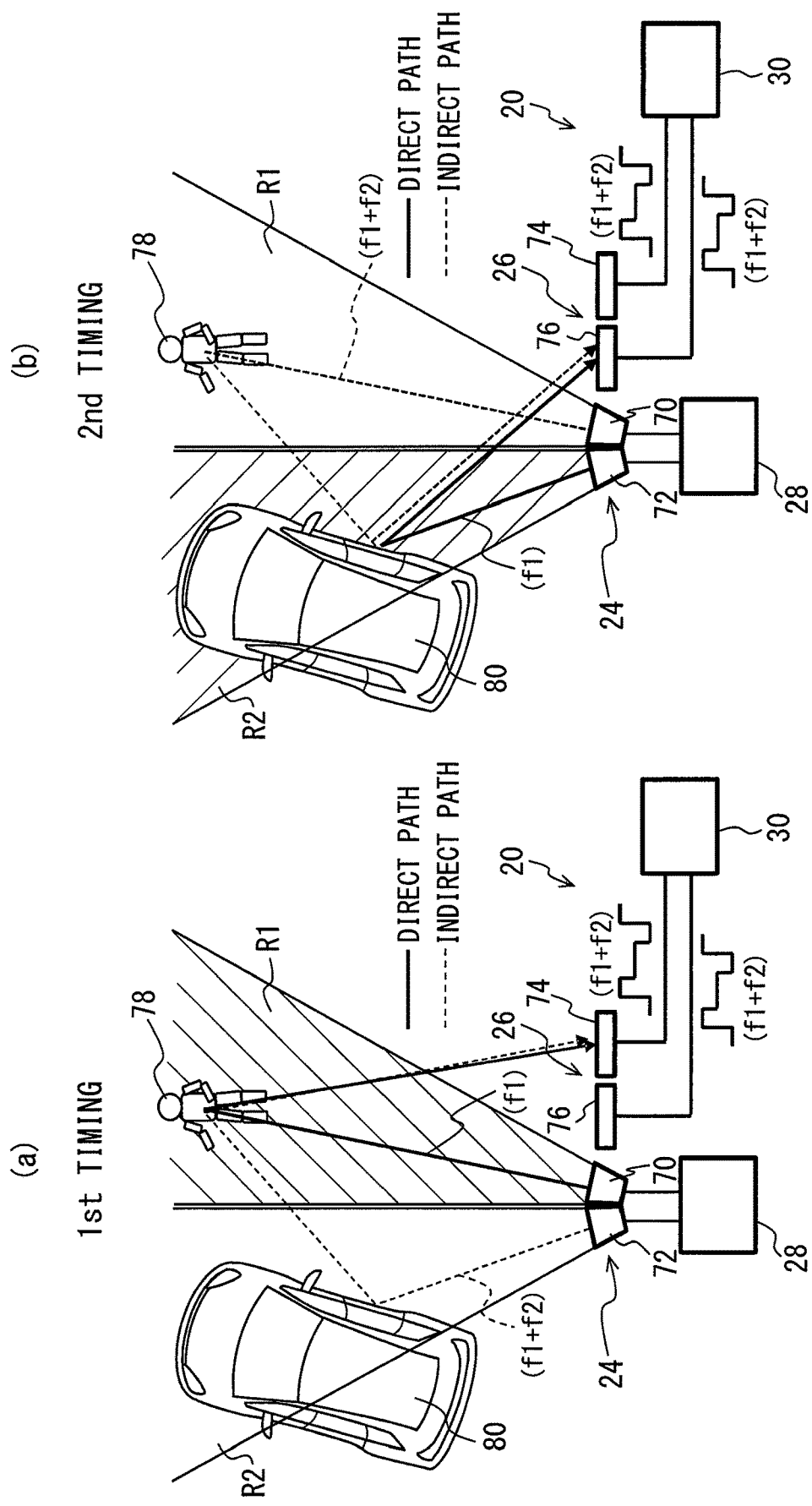
FIG. 16 (a) is a schematic diagram of a time-of-flight distance measuring device when a first sub-region is a target region and FIG. 16 (b) is a schematic view of the time-of-flight distance measuring device when a second sub-region is the target region according to a fourth embodiment.

In the above-described embodiments, the TOF device 20 detects occurrence of a multipath error as to an object in the first sub-region R1, i.e., the target region for a multipath error is the first sub-region R1. In the fourth embodiment, the TOF device 20 is configured to switch the target region between the first sub-region R1 and the second sub-region R2. For example, the TOF device 20 sets the target region to the first sub-region R1 at a first timing, as shown in FIG. 16 (a), and then sets the target region to the second sub-region R2 at a second timing, as shown in FIG. 16 (b). At the first timing, the emitter controller 28 controls the first emitting portion 70 to emit the emitted light including the fundamental component and controls the second emitting portion 72 to emit the emitted light including the fundamental component and the second-order harmonic component. Also, at each of the first timing and the second timing, the receiver controller 30 controls the first receiving portion 74 and the second receiving portion 76 to be simultaneously sensible to the fundamental component and the second-order harmonic component.

Figure 17:
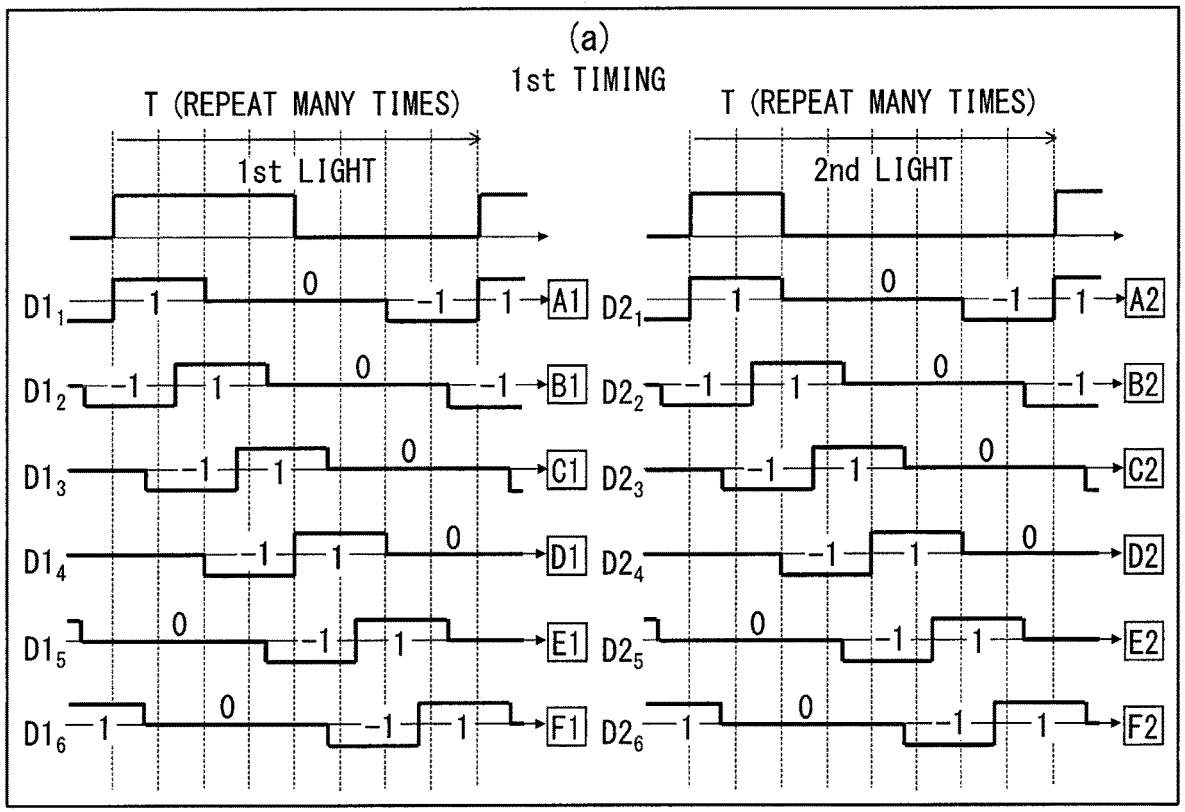
FIG. 17 (a) is the differential sequence of the first control signals and the second control signals at a first timing and FIG. 17 (b) is the differential sequence of the first control signals and the second control signals at a second timing according to the fourth embodiment.
Figure 17:
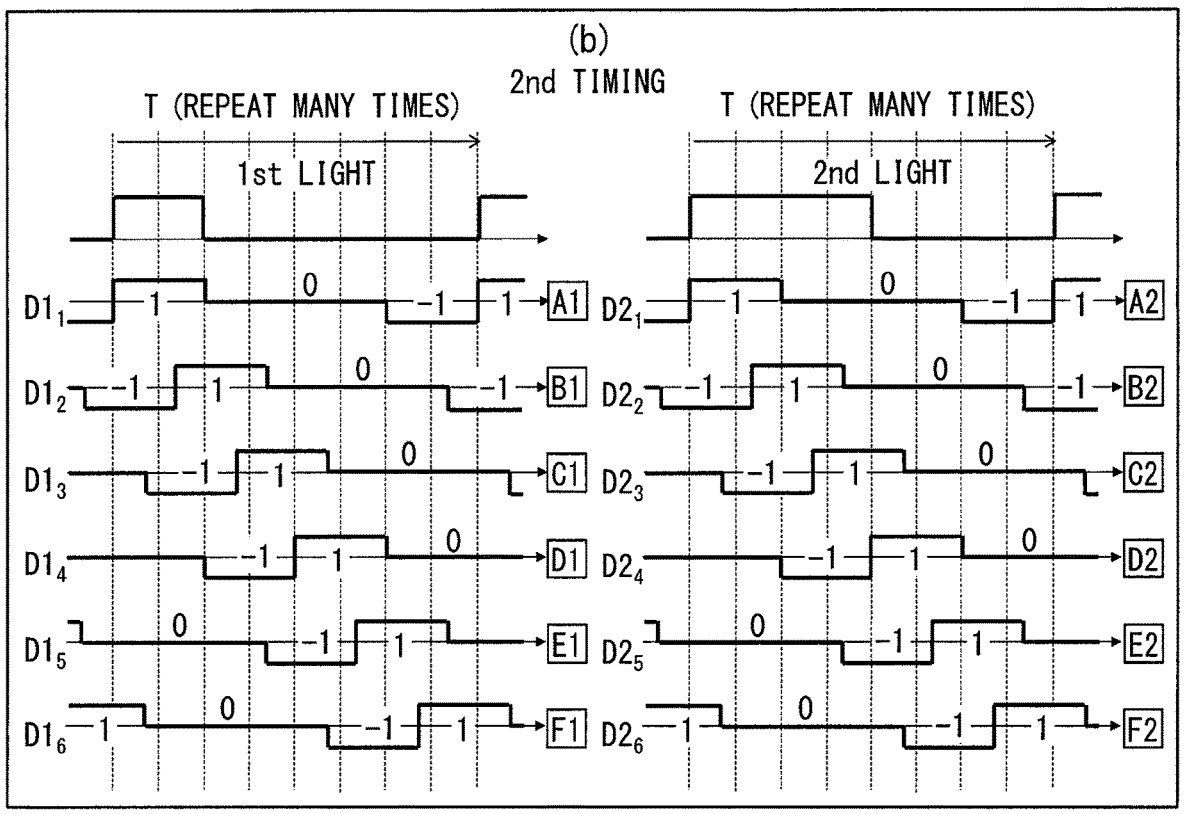

FIG. 17 shows a sampling sequence according to the present embodiment. As shown in FIG. 17, the first control signals $D1_1$ to $D1_6$ for the first pixel sensors A1 to F1 and the second control signals D21 to D26 for the second pixel sensors A2 to F2 are the same as those of the first embodiment. In other words, both the first receiving portion 74 and the second receiving portion 76 are controlled to be sensible to both the fundamental component and the second-order harmonic component. At the first timing, the emitted light from the first emitting portion 70 has at a 50% duty cycle and the emitted light from the second emitting portion 72 has a 25% duty cycle, as with the first embodiment. However, at the second timing, the emitted light from the first emitting portion 70 has a 25% duty cycle and the emitted light from the second emitting portion 72 has a 50% duty cycle.

In the fourth embodiment, the multipath detector 82 detects, at the first timing, occurrence of a multipath error as to a distance to an object within the first sub-region R1 (e.g., the pedestrian 78) when the first receiving portion 74 detects the fundamental component and the second-order harmonic component of the reflected light, as shown in FIG. 16 (a). At the second timing, the multipath detector 82 detects occurrence of a multipath error as to a distance to an object within the second sub-region R2 (e.g., the other vehicle 80), as shown in FIG. 16 (b). In this way, the TOF device 20 according to the fourth embodiment can detect occurrence of a multipath error as to both the first sub-region R1 and the second sub-region R2 by just switching the light emission pattern of the first emitting portion 70 and the second emitting portion 72.

Modification to Fourth Embodiment

In the fourth embodiment, both the first receiving portion 74 and the second receiving portion 76 are controlled to be sensible to the fundamental component and the second-order harmonic component, at each of the first timing and the second timing. However, the light receiving pattern (the light exposure pattern) can vary for each of the first timing and the second timing. For example, at the first timing, the first receiving portion 74 may be controlled to be sensible to both the fundamental component and the second-order harmonic component, and the second receiving portion 76 may be controlled to be sensible to only the fundamental component. Then, at the second timing, the first receiving portion 74 may be controlled to be sensible to only the fundamental component and the second receiving portion 76 may be controlled to be sensible to both the fundamental component and the second-order harmonic component.

Alternatively, the first receiving portion 74 may be divided into two sub-first receiving groups, and the second receiving portion 76 may be divided into two sub-second receiving groups. One sub-first receiving group may be controlled to be sensible only the fundamental component, and the other sub-first receiving group may be controlled to be sensible both the fundamental component and the second-order harmonic component. Similarly, one sub-second receiving group may be controlled to be sensible to only the fundamental component and the other sub-second receiving group may be controlled to be sensible to both the fundamental component and the second-order harmonic component. In this case, the target region can be switched by only changing the light emission pattern of the first emitting portion 70 and the second emitting portion 72 without changing the light receiving pattern (the light exposure pattern).

Fifth Embodiment

Figure 18:
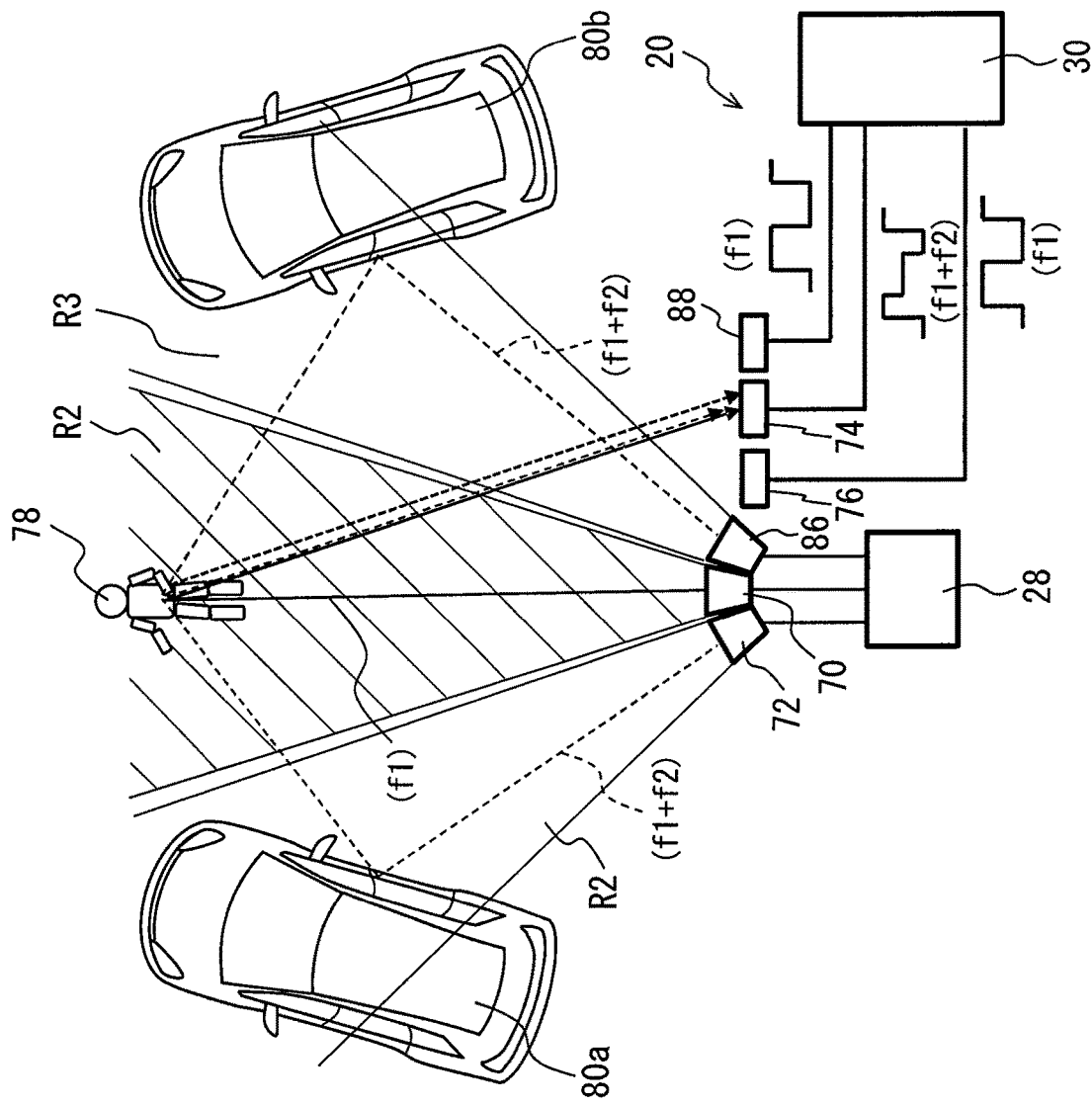
FIG. 18 is an schematic diagram of a time-of-flight distance measuring device according to a fifth embodiment.

In the above-described embodiment, the specified region illuminated by the light source 24 is divided into two sub-regions (the first sub-region R1 and the second sub-region R2). However, the number of the sub-regions may be changeable. In the fourth embodiment, as shown in FIG. 18, the specified region is divided into, e.g., 3 sub-regions R1, R2, R3, each of which does not overlap each other. The TOF device 20 includes first to third emitting portions 70, 72, 86 and first to third receiving portions 74, 76, 88. The first emitting portion 70 only illuminates the first sub-region R1, the second emitting portion 72 only illuminates the second sub-region R2, and the third emitting portion 86 only illuminates the third sub-region R3.

The first to third receiving portions 74, 76, 88 are arranged on the substrate 92 and are spaced away each other. The pair of the first emitting portion 70 and the first receiving portion 74, the pair of the second emitting portion 72 and the second receiving portion 76, and the pair of the third emitting portion 86 and the third receiving portion 88 each form an optical relationship. That is, the first receiving portion 74 only senses the reflected light reflected from the first sub-region R1, the second receiving portion 76 only senses the reflected light reflected from the second sub-region R2, and the third receiving portion 88 only senses the reflected light reflected from the third sub-region R3.

Figure 19:
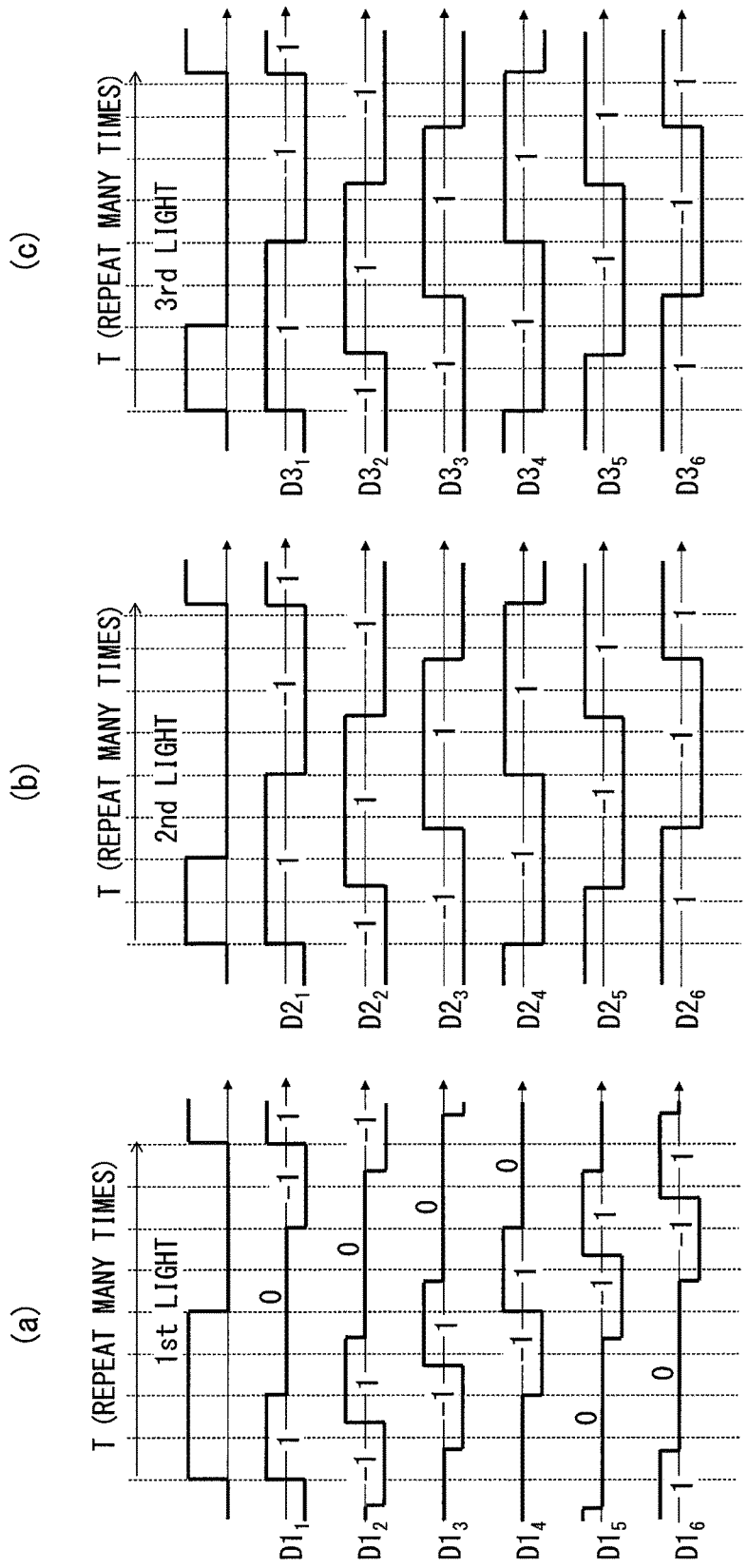
FIG. 19 (a) is the differential sequence of the first control signals, FIG. 19 (b) is the differential sequence of the second control signals, and FIG. 19 (c) is the differential sequence of third control signals according to the fifth embodiment.

As shown in FIG. 19 (*a*), the emitter controller 28 controls the first emitting portion 70 to emit the emitted light including the fundamental component at a 50% duty cycle. The receiver controller 28 controls the first receiving portion 74 to simultaneously sense the fundamental component and the second-order harmonic component. That is, the first control signals D11 to D16 have the third state "0". In contrast, the emitter controller 28 controls the second emitting portion 72 and the third emitting portion 86 to emit both the fundamental component and the second-order harmonic component at a 25% duty cycle, as shown in FIG. 19 (*b*) and FIG. 19 (*c*). The receiver controller 30 controls the second receiving portion 76 and the third receiving portion 88 to sense only the fundamental component. That is, the second control signals D21 to D26 and third control signals D31 to D36 for the third receiving portion 88 do not have the third state "0".

In the present embodiment, the first sub-region R1 is set to be the target region. When the first receiving portion 74 senses the fundamental component and the second-order harmonic component, the multipath detector 82 detects occurrence of a multipath error in a distance to an object (e.g., the pedestrian 78) within the first sub-region R1. For example, if a first other vehicle 80*a* enters into the second sub-region R2 and multipath interference arises due to the reflected light reflected by the first other vehicle 80*a*, as shown in FIG. 18 (*a*), the first receiving portion 74 senses the fundamental component and the second-order harmonic component. When the first receiving portion 74 senses the fundamental component and the second-order harmonic component, the multipath detector 82 detects occurrence of a multipath error.

Similarly, if a second other vehicle 80*b* enters the third sub-region R3 and multipath interference arises by the second other vehicle 80*b*, the first receiving portion 74 senses the fundamental component and the second-order harmonic component of the reflected light reflected by the second other vehicle 80*b*. In this case, the multipath detector 82 also detects occurrence of the multipath error. In this way, the TOF device 20 according to the fifth embodiment can detect occurrence of a multipath error due to the reflected light illuminating the second sub-region R2 or third sub-region R3.

In the fifth embodiment, the second and third emitting portion 72, 86 are controlled to emit the emitted light including both the fundamental component and the second-order harmonic component, and when the first receiving portion 74 senses the fundamental component and the second-order harmonic component, the multipath detector 82 detects occurrence of a multipath error. However, the second and third emitting portion 72, 86 may be controlled to emit emitted light including, for example, the fundamental component and the third-order harmonic component, and when the first receiving portion 74 senses the fundamental component and the third-order harmonic component, the multipath detector 82 may detect occurrence a multipath error.

Furthermore, the second emitting portion 72 may be controlled to emit, for example, the fundamental component and the second-order harmonic component, whereas the third emitting portion 86 may be controlled to emit the emitted light including, for example, the fundamental component and the third-order harmonic component. In this case, the first receiving portion 74 may be controlled to be sensible to the fundamental component, the second-order harmonic component, and the third-order harmonic component. And then, if the first receiving portion 74 senses the fundamental component and the second-order harmonic component, the multipath detector 82 may detect occurrence of a multipath error associated with the second sub-region R2. If the first receiving portion 74 senses the fundamental component and the third-order harmonic component, the multipath detector 82 may detect occurrence of a multipath error associated with the third sub-region R3. Furthermore, if the first receiving portion 74 senses the fundamental component, the second-order harmonic component, and the third-order harmonic component, the multipath detector 82 may detect occurrence of multipath errors associated with both the second sub-region R2 and the third sub-region R3.

In the above-described embodiments, when the second emitting portion 72 is controlled to emit the emitted light including the fundamental component and the second-order harmonic component, the emitted light is controlled to have a 25% duty ratio (i.e., less than 50%). However, in a situation where it is difficult to set a duty cycle to be less than 50%, the emitted light from the second emitting portion 72 may be controlled to have a duty cycle more than 50%. For example, by setting a duty cycle to be 75%, the second-order harmonic component can be sensed by the light receiver 26 by introducing the third state in the control signals. Accordingly, even if there is a situation where it is difficult to set a duty cycle to be less than 50%, the second-order harmonic component can be detected.

In the above-described embodiment, each sensing unit 40 is formed of six pixel sensors 80. However, the sensing unit 40 may be formed of 5 pixel sensors 80 or seven or more pixel sensors 80.

The invention claimed is:

1. A time-of-flight distance measuring device comprising:
    a light source that emits light, as emitted light, to illuminate a specified region;
    a light receiver that detects, as reflected light, the emitted light reflected by an object in the specified region;
    a first controller that controls the light source;
    a second controller that controls the light receiver;
    a processor configured to:
        calculate a distance to the object based on the reflected light detected by the light receiver; and
        detect occurrence of a multipath error,
    wherein
        the specified region is divided into a plurality of sub-regions,
        the light source includes a plurality of emitting portions, each of the plurality of emitting portions illuminating a respective one of the plurality of sub-regions,
        the light receiver includes a plurality of receiving portions corresponding to respective ones of the plurality of emitting portions, each of the plurality of receiving portions being spaced away from each other to sense the reflected light reflected from the sub-region illuminated by the corresponding emitting portion, the first controller controls (i) a first emitting portion of the plurality of emitting portions to emit the emitted light as an amplitude-modulated waveform including an Nth-order harmonic component of a fundamental frequency and (ii) a second emitting portion of the plurality of emitting portions to emit the emitted light as an amplitude-modulated waveform including an Mth-order harmonic component of the fundamental frequency, wherein N and M are different positive integers, the second controller controls a particular receiving portion of the plurality of receiving portions corresponding to the first emitting portion of the plurality of emitting portions to be sensible to the Nth-order harmonic component and the Mth-order harmonic component, and the processor detects occurrence of the multipath error when the particular receiving portion senses both the Nth-order harmonic component and the Mth-order harmonic component.

2. The time-of-flight distance measuring device according to claim 1, wherein
M is an even number, and
the first controller controls the second emitting portion to emit the emitted light at a duty cycle of less than 50%.

3. The time-of-flight distance measuring device according to claim 2, wherein
M is 2, and
the first controller controls the second emitting portion to emit the emitted light at a duty cycle of 25%.

4. The time-of-flight distance measuring device according to claim 1, wherein
at least one of N and M is an even number,
each of the plurality of receiving portions includes a plurality of photodetectors,
the second controller generates a plurality of control signals and outputs each of the plurality of control signals to a respective one of the plurality of photodetectors,
each of a plurality of particular photodetectors of the particular receiving portion includes a photo element, a first capacitor, a second capacitor, a first switch connected to the first capacitor, and a second switch connected to the second capacitor,
each of a plurality of particular control signals of the plurality of control signals for the plurality of particular photodetectors switches an on/off state of the first switch and the second switch,
the photo element outputs electricity when the photo element is exposed to the reflected light,
the first capacitor stores electric charge output from the photo element when the first switch is on and the second capacitor stores electric charge output from the photo element when the second switch is on,
each of the plurality of particular control signals switches the on/off state between a first state where the first switch is on and the second switch is off, a second state where the first switch is off and the second switch is on, and a third state where the first switch and the second switch are both on or both off, and
each of the plurality of particular control signals switches the on/off state such that the third state occurs between the first state and the second state.

5. The time-of-flight distance measuring device according to claim 4, wherein
the third state is a state where the first switch and the second switch are both on, and
the electric charge stored in the first capacitor and the second capacitor during the third state is canceled.

6. The time-of-flight distance measuring device according to claim 4, wherein
each of the plurality of particular photodetectors further includes a sub switch,
the third state is a state where both the first switch and the second switch are off and the sub switch is on, and
the electricity output from the photo element during the third state is discharged through the sub switch.

7. A time-of-flight distance measuring device comprising:
a light source that emits light, as emitted light, to illuminate a specified region;
a light receiver that detects, as reflected light, the emitted light reflected by an object in the specified region;
a first controller that controls the light source;
a second controller that controls the light receiver;
a processor configured to:
calculate a distance to the object based on the reflected light detected by the light receiver; and
detect occurrence of a multipath error,
wherein
the specified region is divided into a plurality of sub-regions,
the light source includes a plurality of emitting portions, each of the plurality of emitting portions illuminating a respective one of the plurality of sub-regions,
the light receiver includes a plurality of receiving portions corresponding to respective ones of the plurality of emitting portions, each of the plurality of receiving portions being spaced away from each other to sense the reflected light reflected from the sub-region illuminated by the corresponding emitting portion,
the first controller controls,
at a first timing, (i) a first emitting portion of the plurality of emitting portions to emit the emitted light as an amplitude-modulated waveform including an Nth-order harmonic component of a fundamental frequency and (ii) a second emitting portion of the plurality of emitting portions to emit the emitted light as an amplitude-modulated waveform including an Mth-order harmonic component of the fundamental frequency, wherein N and M are different positive integers, and
at a second timing, (i) the second emitting portion to emit the emitted light as an amplitude-modulated waveform including the Nth-order harmonic component of the fundamental frequency and (ii) the first emitting portion to emit the emitted light as an amplitude-modulated waveform including the Mth-order harmonic component of the fundamental frequency,
the second controller controls,
at the first timing, a first receiving portion of the plurality of receiving portions corresponding to the first emitting portion to be sensible to the Nth-order harmonic component and the Mth-order harmonic component, and
at the second timing, a second receiving portion of the plurality of receiving portions corresponding to the second emitting portion to be sensible to the Nth-order harmonic component and the Mth-order harmonic component, and the processor detects occurrence of the multipath error when (i) the first receiving portion senses, at the first timing, both the Nth-order harmonic component and the Mth-order harmonic component or (ii) the second receiving portion senses, at the second timing, both the Nth-order harmonic component and the Mth-order harmonic component.

8. The time-of-flight distance measuring device according to claim 7, wherein

M is an even number, and the first controller controls (i) the second emitting portion, at the first timing, to emit the emitted light at a duty cycle of less than 50% and (ii) the first emitting portion, at the second timing, to emit the emitted light at a duty of less than 50%.

9. The time-of-flight distance measuring device according to claim 8, wherein

M is 2, and the first controller controls (i) the second emitting portion, at the first timing, to emit the emitted light at a duty cycle of 25% and (ii) the first emitting portion, at the second timing, to emit the emitted light at a duty cycle of 25%.

10. A method for detecting a multipath error using a time-of-flight distance measuring technology, comprising:

controlling, by a first controller, a light source to emit light, as emitted light, to illuminate a specified region;

controlling, by a second controller, a light receiver to detect, as detected light, the emitted light reflected by an object in the specified region;

calculating, by a calculator, a distance to the object based on the reflected light detected by the light receiver; and detecting, by a multipath detector, occurrence of a multipath error, wherein the specified region is divided into a plurality of sub-regions, the light source includes a plurality of emitting portions, each of the plurality of emitting portions illuminating a respective one of the plurality of sub-regions, the light receiver includes a plurality of receiving portions corresponding to respective ones of the plurality of emitting portions, each of the plurality of receiving portions being spaced away from each other to sense the reflected light reflected from the sub-region illuminated by the corresponding emitting portion, the first controller controls (i) a first emitting portion of the plurality of emitting portions to emit the emitted light as an amplitude-modulated waveform including an Nth-order harmonic component of a fundamental frequency and (ii) a second emitting portion of the plurality of emitting portions to emit the emitted light as an amplitude-modulated waveform including an Mth-order harmonic component of the fundamental frequency, wherein N and M are different positive integers, the second controller controls a particular receiving portion of the plurality of receiving portions corresponding to the first emitting portion to be sensible to the Nth-order harmonic component and the Mth-order harmonic component, and the multipath detector detects occurrence of the multipath error when the particular receiving portion senses both the Nth-order harmonic component and the Mth-order harmonic component.

11. A method for detecting a multipath error using a time-of-flight distance measuring technology, comprising:

controlling, by a first controller, a light source to emit light, as emitted light, to illuminate a specified region;

controlling, by a second controller, a light receiver to detect, as detected light, the emitted light reflected by an object in the specified region;

calculating, by a calculator, a distance to the object based on the reflected light detected by the light receiver; and detecting, by a multipath detector, occurrence of a multipath error, wherein the specified region is divided into a plurality of sub-regions, the light source includes a plurality of emitting portions, each of the plurality of emitting portions illuminating a respective one of the plurality of sub-regions, the light receiver includes a plurality of receiving portions corresponding to respective ones of the plurality of emitting portions, each of the plurality of receiving portions being spaced away from each other to sense the reflected light reflected from the sub-region illuminated by the corresponding emitting portion, the first controller controls, at a first timing, (i) a first emitting portion of the plurality of emitting portions to emit the emitted light as an amplitude-modulated waveform including an Nth-order harmonic component of a fundamental frequency and (ii) a second emitting portion of the plurality of emitting portions to emit the emitted light as an amplitude-modulated waveform including an Mth-order harmonic component of the fundamental frequency, wherein N and M are different positive integers, and at a second timing, (i) the second emitting portion to emit the emitted light as an amplitude-modulated waveform including the Nth-order harmonic component of the fundamental frequency and (ii) the first emitting portion to emit the emitted light as an amplitude-modulated waveform including the Mth-order harmonic component of the fundamental frequency, the second controller controls, at the first timing, a first receiving portion of the plurality of receiving portions corresponding to the first emitting portion to be sensible to the Nth-order harmonic component and the Mth-order harmonic component, and at the second timing, a second receiving portion of the plurality of receiving portions corresponding to the second emitting portion to be sensible to the Nth-order harmonic component and the Mth-order harmonic component, and the multipath detector detects occurrence of the multipath error when (i) the first receiving portion senses, at the first timing, both the Nth-order harmonic component and the Mth-order harmonic component or (ii) the second receiving portion senses, at the second timing, both the Nth-order harmonic component and the Mth-order harmonic component.

* * * * *